(12) United States Patent
Wei et al.

(10) Patent No.: US 8,836,165 B2
(45) Date of Patent: Sep. 16, 2014

(54) DUAL-SOURCE CONVERTER WITH AUXILIARY CIRCUIT AND CONTROLLER

(75) Inventors: Jung-Tzung Wei, Taoyuan County (TW); Chung-You Lin, Taoyuan County (TW); Bo-Han Chen, Taoyuan County (TW); Kuo-Kuang Jen, Taoyuan County (TW); Yu-Min Liao, Taoyuan County (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 932 days.

(21) Appl. No.: 12/968,165

(22) Filed: Dec. 14, 2010

(65) Prior Publication Data

US 2012/0007433 A1 Jan. 12, 2012

(30) Foreign Application Priority Data

Jul. 9, 2010 (TW) ................................ 99122687 A

(51) Int. Cl.
*H02J 1/00* (2006.01)
*H02M 1/10* (2006.01)
*H02M 3/158* (2006.01)
*H02J 1/10* (2006.01)

(52) U.S. Cl.
CPC *H02M 1/10* (2013.01); *H02J 1/102* (2013.01); *Y02B 10/30* (2013.01); *H02M 3/158* (2013.01)
USPC ............... 307/77; 323/234; 323/271; 363/13; 363/19; 363/21.1

(58) Field of Classification Search
CPC ........... H02M 1/10; H02J 1/102; Y02B 10/30
USPC ............ 307/70; 323/234, 271; 363/13, 19, 21
See application file for complete search history.

(56) References Cited

U.S. PATENT DOCUMENTS

| | | | | |
|---|---|---|---|---|
| 5,654,591 A * | 8/1997 | Mabboux et al. | ............... | 307/66 |
| 6,014,321 A * | 1/2000 | Bergk | ............. | 363/18 |
| 6,525,435 B2 * | 2/2003 | Lau et al. | ......... | 307/52 |
| 6,650,560 B2 * | 11/2003 | MacDonald et al. | ......... | 363/142 |
| 6,833,635 B2 * | 12/2004 | Kippley | ......... | 307/83 |
| 7,638,902 B2 * | 12/2009 | Hwang | ......... | 307/130 |
| 8,039,993 B2 * | 10/2011 | Kaplan | ......... | 307/98 |
| 8,143,744 B2 * | 3/2012 | Nielsen et al. | ......... | 307/66 |
| 8,503,204 B2 * | 8/2013 | Carletti et al. | ......... | 363/78 |
| 8,542,509 B2 * | 9/2013 | Sagneri et al. | ......... | 363/69 |
| 8,581,561 B2 * | 11/2013 | Yun et al. | ......... | 323/266 |
| 2002/0011751 A1 * | 1/2002 | Lau et al. | ......... | 307/52 |
| 2002/0047693 A1 * | 4/2002 | Chang | ......... | 323/222 |
| 2002/0060914 A1 * | 5/2002 | Porter et al. | ......... | 363/21.01 |
| 2002/0087862 A1 * | 7/2002 | Jain et al. | ......... | 713/176 |

(Continued)

*Primary Examiner* — Rexford Barnie
*Assistant Examiner* — Elim Ortiz
(74) *Attorney, Agent, or Firm* — Jackson IPG PLLC

(57) ABSTRACT

Disclosed is a dual-source converter for a hybrid power supply. The converter includes a first power circuit, a second power circuit, an auxiliary circuit, an output circuit and a closed loop circuit. The first power circuit is electrically connected to the second power circuit in series for receiving two varied voltage sources. The auxiliary circuit is configured to achieve soft switching of all switches. The closed loop circuit is configured to control the duty cycles of the first power circuit, the second power circuit and the auxiliary circuit so as to improve the efficiency of the dual-source converter.

10 Claims, 29 Drawing Sheets

(56) References Cited

U.S. PATENT DOCUMENTS

| | | | |
|---|---|---|---|
| 2002/0136029 A1* | 9/2002 | Ledenev et al. | 363/16 |
| 2002/0185993 A1* | 12/2002 | Qian | 323/282 |
| 2004/0084967 A1* | 5/2004 | Nielsen | 307/66 |
| 2004/0245966 A1* | 12/2004 | Fuentes | 323/222 |
| 2005/0068010 A1* | 3/2005 | Chen et al. | 323/210 |
| 2005/0200341 A1* | 9/2005 | Kohout et al. | 323/282 |
| 2007/0263617 A1* | 11/2007 | Takemura | 370/360 |
| 2009/0195700 A1* | 8/2009 | Yun | 348/723 |
| 2009/0271642 A1* | 10/2009 | Cheng et al. | 713/300 |
| 2009/0278408 A1* | 11/2009 | Cioffi | 307/80 |
| 2010/0033156 A1* | 2/2010 | Abe et al. | 323/305 |
| 2010/0127678 A1* | 5/2010 | Inatomi et al. | 323/282 |
| 2011/0309682 A1* | 12/2011 | Chiba | 307/75 |
| 2012/0286579 A1* | 11/2012 | Mourra | 307/80 |
| 2014/0045220 A1* | 2/2014 | Chen et al. | 435/91.2 |

* cited by examiner

Mode 1 [$t_0 \sim t_1$]

Mode 3 [$t_2 \sim t_3$]

Mode 7 [$t_6 \sim t_7$]

DUAL-SOURCE CONVERTER WITH AUXILIARY CIRCUIT AND CONTROLLER

BACKGROUND OF INVENTION

1. Field of Invention

The present invention relates to a converter and, more particularly, to a dual-source converter that can be switched between a single-source mode and a dual-source mode.

2. Related Prior Art

As the population of the world is growing, the consumption of energy is increasing while the reserve of non-renewable energy is declining. Hence, It is getting more important to use renewable energy. To use various types of the renewable energy, there are various types of devices such as fuel cells, solar cells and wind turbines. With help from power electronics and automation techniques, these devices can be used in vehicles, uninterruptible power supplies and independent generators for example. The fuel cells, solar cells and wind turbines however generate current at low voltage. Moreover, the voltage of the current fluctuates with load or the power production is limited by the natural environment. Generally speaking, the renewable energy cannot be sued in ordinary electric appliances directly. Therefore, DC/DC converters are necessary electric devices for using the renewable energy.

Conventionally, one set of electric devices for using the renewable energy is used together with one set of converters to convert the various types of the renewable energy. A conventional system includes many converters connected in parallel to a DC high-voltage bus, and is used as a power source in front of an inverter or used as a direct power source for an electric appliance. The conventional system is however bulky, complicated and expensive. Most of the DC/DC converters are conventional boost-type DC/DC converters. By adjusting the duty cycle of a switch, the boost ratio is controlled. There is however a problem with this process. Conventionally, the switching of the switch is hard switching, and there is a reverse recovery current in an output diode. In the transient on state of a power semiconductor switch, a huge current travels through the output diode to build a reverse-biased voltage. However, the large current, which travels through the semiconductor switch, incurs a serious loss in the switching and a low conversion efficiency.

The present invention is therefore intended to obviate or at least alleviate the problems encountered in prior art.

SUMMARY OF INVENTION

It is an objective of the present invention to provide a dual-source converter for executing soft switching with a low loss in turning on.

It is another objective of the present invention to provide a dual-source converter that can be used in a hybrid generation system to effectively increase the total conversion efficiency but reduce the cost of building the hybrid generation system.

To achieve the foregoing objectives, the dual-source converter includes a first power source circuit, a second power source circuit, an auxiliary circuit, an output circuit and a closed-loop controller. The first power source circuit includes a first power-source switch and a first switch. The first power-source switch is electrically connected to a first power source. The first switch is coupled to the first power-source switch. The first power source circuit converts the first power source to a first current source. The second power source circuit is connected, in series, to the first power source circuit. The second power source circuit includes a second power-source switch and a second switch. The second power-source switch is electrically connected to a second power source. The second switch is coupled to the second power-source switch. The second power source circuit converts the second power source to a second current source. The auxiliary circuit includes an auxiliary switch, a first auxiliary diode, a second auxiliary diode, an auxiliary capacitor and an auxiliary inductor. The auxiliary switch includes first and second ends. The second end of the auxiliary switch is coupled to a first end of the first switch. The first auxiliary diode includes first and second ends. The first end of the first auxiliary diode is electrically connected to the second end of the auxiliary switch. The second auxiliary diode includes first and second ends. The first end of the second auxiliary diode is electrically connected to the second end of the first auxiliary diode. The second end of the second auxiliary diode is electrically connected to the first end of the auxiliary switch. The second auxiliary diode is used to suppress a voltage across the first auxiliary diode. The auxiliary capacitor includes first and second ends. The first end of the auxiliary capacitor is electrically connected to the first end of the auxiliary switch. The second end of the auxiliary capacitor is electrically connected to the second end of the second switch. The auxiliary capacitor is used to store energy of the first and second current sources. The auxiliary inductor includes first and second end. The first end of the auxiliary inductor is electrically connected to the second end of the first auxiliary diode. The auxiliary inductor is used to release the energy of the first and second current sources from the auxiliary capacitor. The auxiliary circuit stores or releases the energy of the first and second current sources by switching the auxiliary switch. The output circuit is electrically connected to the auxiliary circuit. The output circuit receives the energy of the first and second current sources from the auxiliary inductor. The closed-loop controller is electrically connected to the first and second power source circuits, the auxiliary circuit and the output circuit. Based on a feedback signal and a command signal, the closed-loop controller controls duty cycles of the first and second switches and the auxiliary switch so that the first and second switches and the auxiliary switch can be switched at zero voltage. The closed-loop controller controls the switching of the first and second power switches so that the first and second power sources are connected or cut off.

In another aspect, each of the first power source and the second power source is selected from the group consisting of a secondary cell, a super capacitor, a fuel cell, a solar cell, a DC wind turbine and a rectified AC wind turbine.

In another aspect, the first power source circuit further includes a first inductor between the first power-source switch and the first switch. The second power source circuit further includes a second inductor between the second power-source switch and the second switch. The first inductor and the second inductor respectively filter out current ripples from the first power source and the second power source and store the energy of the first and second power sources.

In another aspect, the first power source circuit further includes a first inductor connected, in parallel, to the first power source. The second power source circuit further includes a second inductor connected, in parallel, to the second power source. The first inductor and the second inductor respectively filter out current ripples from the first power source and the second power source and store the energy of the first and second power sources.

In another aspect, the closed-loop controller includes a controlling circuit and a driving circuit. The controlling circuit compares the feedback signal with the command signal and provides a controlling signal according to the comparison. The driving circuit provides a plurality of driving signals to the first switch, the second switch and the auxiliary switch according to the controlling signal. The driving circuit provides a plurality of switching signals to the first power-source switch and the second power-source switch.

In another aspect, the feedback signal is provided from the first power source circuit, the second power source circuit or the output circuit. The command signal is a nominal current or voltage corresponding to the feedback signal.

In another aspect, the driving signals include a first switch-driving signal, a second switch-driving signal and an auxiliary switch-driving signal. The auxiliary switch-driving signal is the sum of a signal complementary to the first switch-driving signal and another signal complementary to the second switch-driving signal.

In another aspect, the duty cycles of the first switch-driving signal and the second switch-driving signal get longer but the duty cycle of the auxiliary switch-driving signal gets shorter as the controlling signal gets larger. The duty cycles of the first switch-driving signal and the second switch-driving signal get shorter but the duty cycle of the auxiliary switch-driving signal gets longer as the controlling signal gets smaller.

In another aspect, the switching signals include a first power-source switch-switching signal and a second power source-switching signal to control the switching of the first power-source switch and the second power-source switch, respectively.

In another aspect, when the first auxiliary diode builds a reverse-biased voltage, while an auxiliary inductor current continues to travel through the auxiliary inductor, the second auxiliary diode provides a path with a reduced loss in turning on. The auxiliary inductor current travels to the auxiliary capacitor through the second auxiliary diode to reduce a current that travels through a parasitic diode of the auxiliary switch.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
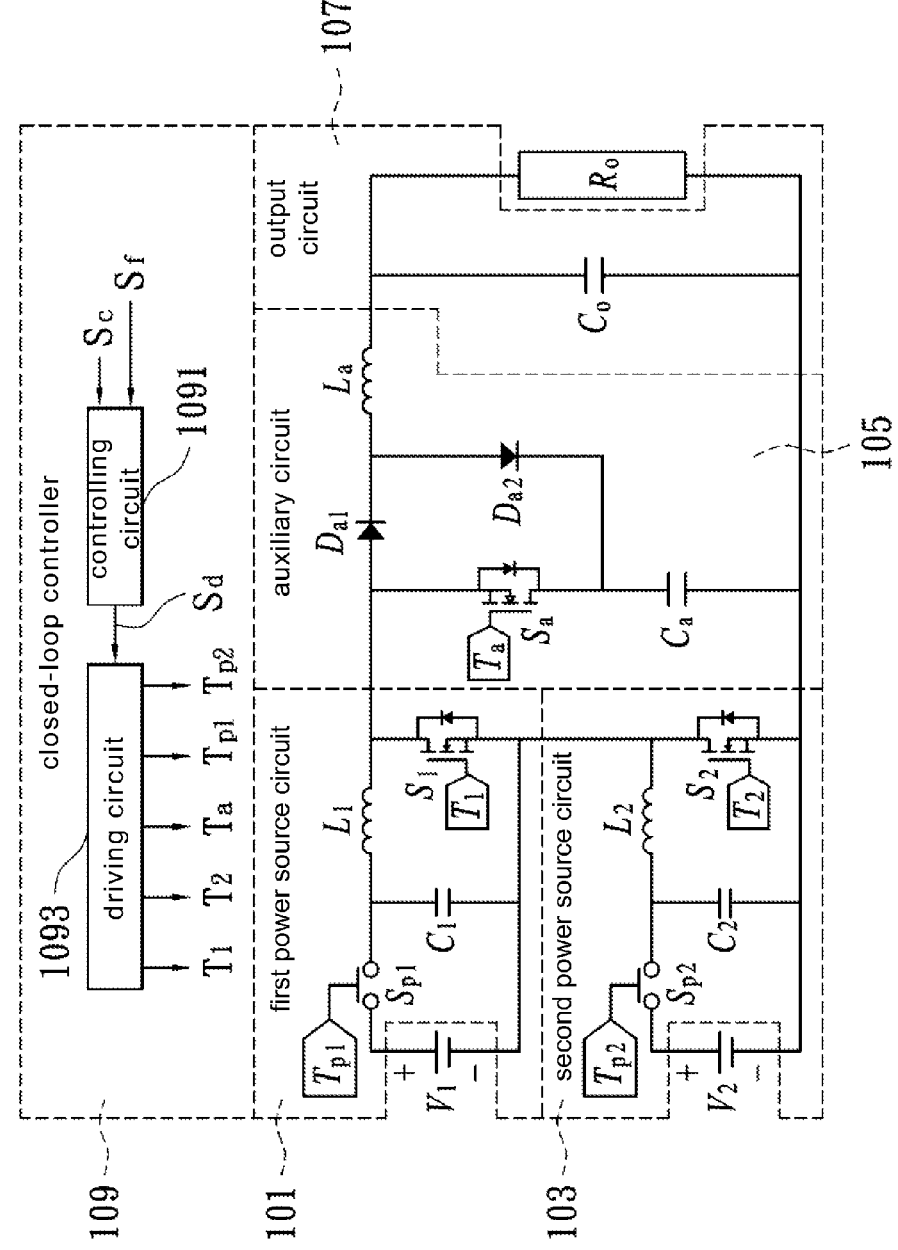
FIG. 1 is a block diagram of a dual-source converter according to the preferred embodiment of the present invention.

Referring to FIG. 1, a dual-source converter 1 includes a first power source circuit 101, a second power source circuit 103, an auxiliary circuit 105, an output circuit 107 and a closed-loop controller 109 according to the preferred embodiment of the present invention. The first power source circuit 101 is electrically connected to the second power source circuit 103 in series. The auxiliary circuit 105 is electrically connected to both of the first power source circuit 101 and the second power source circuit 103. The output circuit 107 is electrically connected to the auxiliary circuit 105. The closed-loop controller 109 is electrically connected to all of the first power source circuit 101, the second power source circuit 103, the auxiliary circuit 105 and the output circuit 107.

In the preferred embodiment, the first power source circuit 101 includes a first power switch $S_{p1}$, a first capacitor $C_1$, a first inductor $L_1$ and a first switch $S_1$. The positive end of the first power switch $S_{p1}$ is electrically connected to the positive end of a first power source $V_1$. The positive end of the first capacitor $C_1$ is electrically connected to the negative end of the first power switch $S_{p1}$. The negative end of the first capacitor $C_1$ is electrically connected to the negative end of the first power source $V_1$. The first power source $V_1$, the first power switch $S_{p1}$ and the first capacitor $C_1$ together form a loop.

Moreover, the positive end of the first inductor $L_1$ is electrically connected to the positive end of the first capacitor $C_1$. The drain of the first switch $S_1$ is electrically connected to the negative end of the first inductor $L_1$. The source of the first switch $S_1$ is electrically connected to the negative end of the first capacitor $C_1$. The first capacitor $C_1$, the first inductor $L_1$ and the first switch $S_1$ together form another loop.

In the preferred embodiment, the second power source circuit 103 includes a second power-source switch $S_{p2}$, a second capacitor $C_2$, a second inductor $L_2$ and a second switch $S_2$. The positive end of the second power source $S_{p2}$ is electrically connected to the positive end of the second power source $V_2$. The positive end of the second capacitor $C_2$ is electrically connected to the negative end of the second power-source switch $S_{p2}$. The negative end of the second capacitor $C_2$ is electrically connected to the negative end of the second power source $V_2$. The second power source $V_2$, the second power-source switch $S_{p2}$ and the second capacitor $C_2$ together form a loop.

Moreover, the positive end of the second inductor $L_2$ is electrically connected to the positive end of the second capacitor $C_2$. The source of the second switch $S_2$ is electrically connected to the negative end of the second capacitor $C_2$. The drain of the second switch $S_2$ is electrically connected to the negative end of the second inductor $L_2$ and the source of the first switch $S_1$. That is, the second power source circuit 103 is connected, in series, to the first power source circuit 101 by the connection of the second switch $S_2$ to the first switch $S_1$. The second inductor $L_2$, the second capacitor $C_2$ and the second switch $S_2$ together form a loop.

The first switch $S_1$ and the second switch $S_2$ are power semiconductor switches. The first power source $V_1$ and the second power source $V_2$ can be secondary cells, super capacitors, fuel cells, solar cells, DC wind turbines or rectified AC wind turbines. The first power source $V_1$ and the second power source $V_2$ can be of a same type or two different types.

The dual-source converter 1 of the present invention is characterized by that the first and second power source circuits are used for different types of renewable energy, and that the two types of energy can be converted to a stable first current and a stable second current, and that the first and second power sources can be switched to one another flexibly. However, the elements included in the first power source circuit 101 and the second power source circuit 103 and their interconnection are not limited to those discussed above. Those skilled in the art can modify the preferred embodiment and achieve the same effects.

In the preferred embodiment, the auxiliary circuit 105 includes an auxiliary switch $S_a$, a first auxiliary diode $D_{a1}$, a second auxiliary diode $D_{a2}$, an auxiliary capacitor $C_a$ and an auxiliary inductor $L_a$. The source of the auxiliary switch $S_a$ is electrically connected to the drain of the first switch $S_1$. The anode of the auxiliary diode $D_{a1}$ is electrically connected to the source of the auxiliary switch $S_a$. The anode of the auxiliary diode $D_{a2}$ is electrically connected to the cathode of the first auxiliary diode $D_{a1}$. The cathode of the second auxiliary diode $D_{a2}$ is electrically connected to the drain of the auxiliary switch $S_a$. The positive end of the auxiliary capacitor $C_a$ is electrically connected to the drain of the auxiliary switch $S_a$. The negative end of the auxiliary capacitor $C_a$ is electrically connected to the source of the second switch $S_2$. The positive end of the auxiliary inductor $L_a$ is electrically connected to the cathode of the auxiliary diode $D_{a1}$.

The auxiliary circuit 105 is characterized by the connection to both of the first power source circuit 101 and the second power source circuit 103. By switching the auxiliary switch $S_a$, electricity of the first current source and electricity of the second current source are stored or released to protect the first switch $S_1$ and the second switch $S_2$. Therefore, the elements of the auxiliary circuit 105 and their interconnection are only given for exemplary purposes. Those skilled in the art can modify the preferred embodiment and achieve the same effects.

In the preferred embodiment, the output circuit 107 includes an output capacitor $C_o$. The positive end of the capacitor $C_o$ is electrically connected to the negative end of the auxiliary inductor $L_a$. The negative end of the capacitor $C_o$ is electrically connected to the negative end of the auxiliary capacitor. The output circuit 107 is used to provide an output voltage to an output load $R_o$. The output load $R_o$ is connected, in parallel, to the capacitor $C_o$.

In the preferred embodiment, the closed-loop controller 109 includes a controlling circuit 1091 and a driving circuit 1093. The controlling circuit 1091 is coupled to the driving circuit 1093. The controlling circuit 1091 receives a feedback signal $S_f$ from the first power source circuit 101, the second power source circuit 103 or the auxiliary circuit 105. Furthermore, the controlling circuit 1091 receives a command signal $S_c$ corresponding to the feedback signal $S_f$. The command signal $S_c$ is the nominal signal of the feedback signal $S_f$. A first switch-driving signal $T_1$, a second switch-driving signal $T_2$ and an auxiliary switch-driving signal $T_a$ are provided from the driving circuit 1093 to adjust the duty cycles of the first switch $S_1$, the second switch $S_2$ and the auxiliary switch $S_a$. Moreover, the driving circuit 1093 can provide a first power-source switching signal $T_{p1}$ and a second power-source switching signal $T_{p2}$ to trigger the first power switch $S_{p1}$ and the second power-source switch $S_{p2}$. Thus, the closed-loop controller 109, the first power source circuit 101, the second power source circuit 103, the auxiliary circuit 105 and the output circuit 107 together form a control mechanism.

Figure 2:
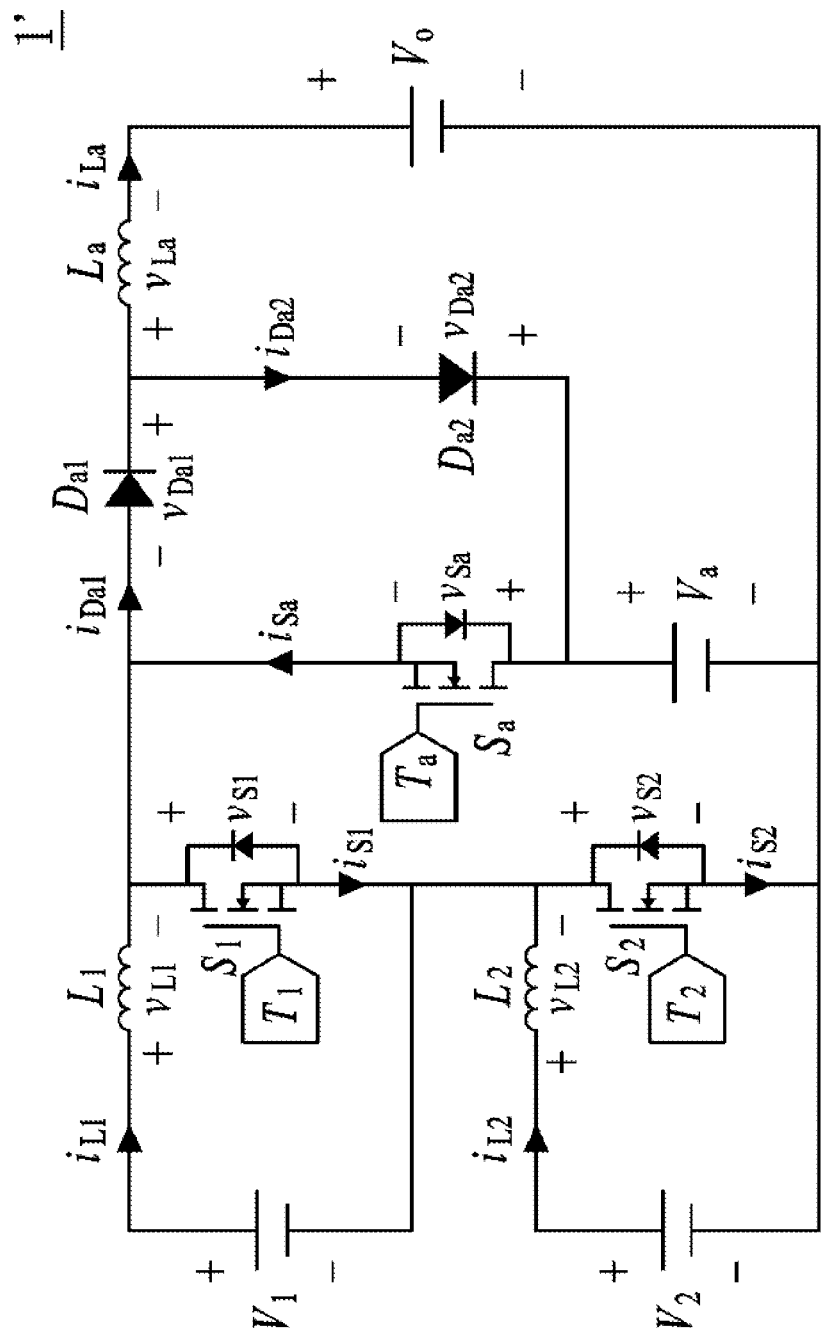
FIG. 2 shows an equivalent circuit of the dual-source converter shown in FIG. 1.
Figure 3A:
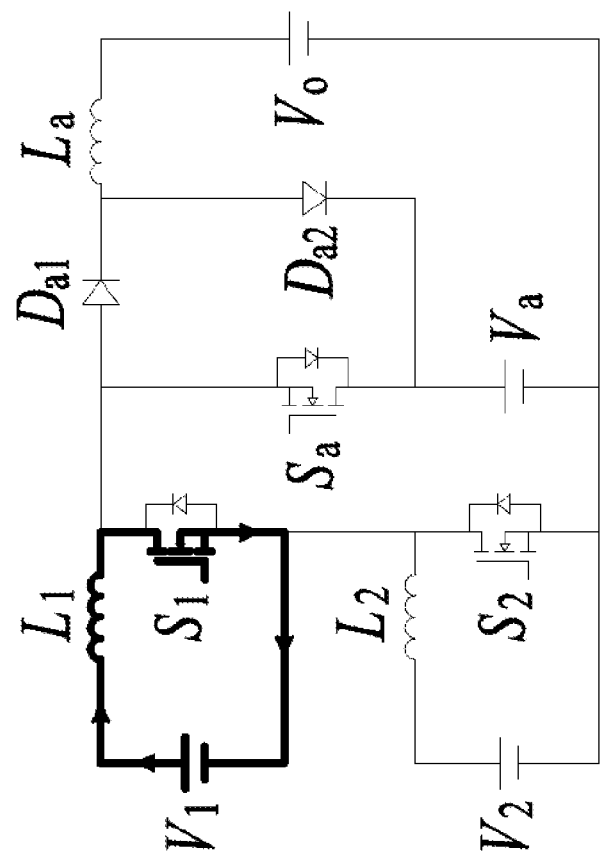
FIGS. 3A-3G shows the dual-source converter shown in FIG. 1, in a single-source mode.
Figure 3B:
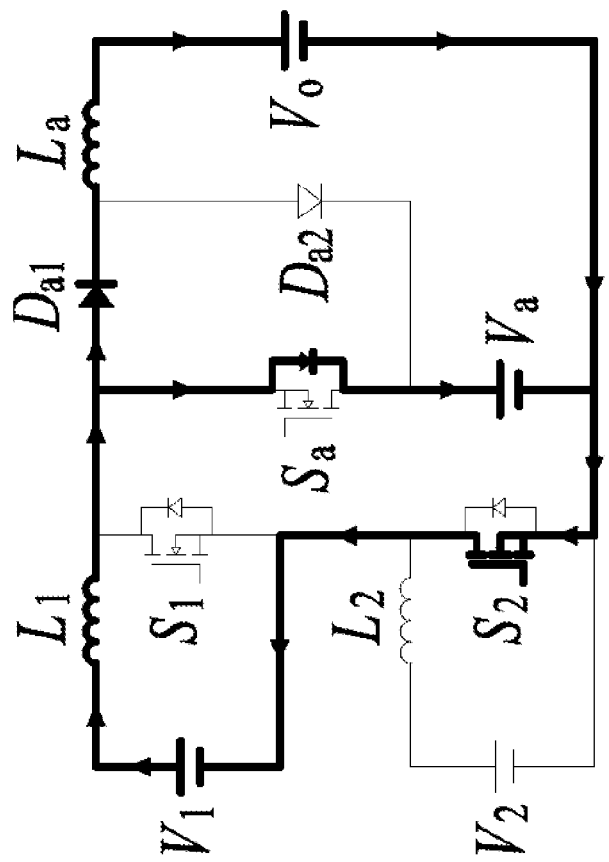
Figure 3C:
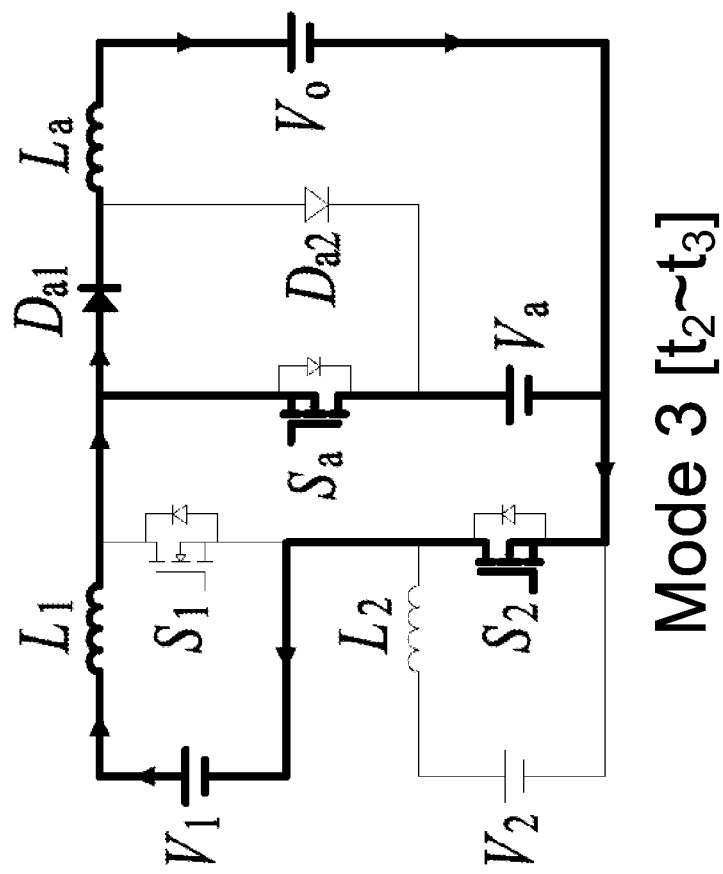
Figure 3D:
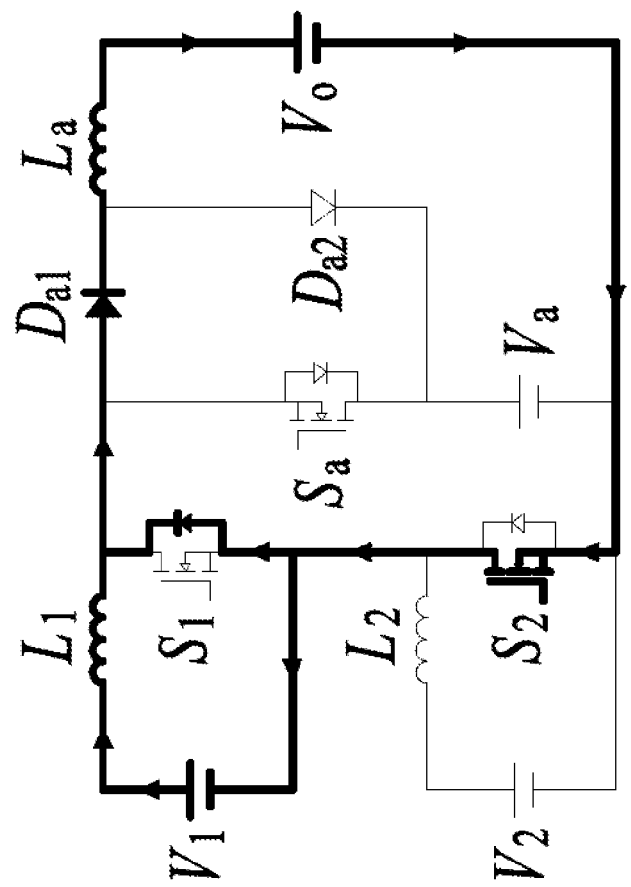
Figure 3E:
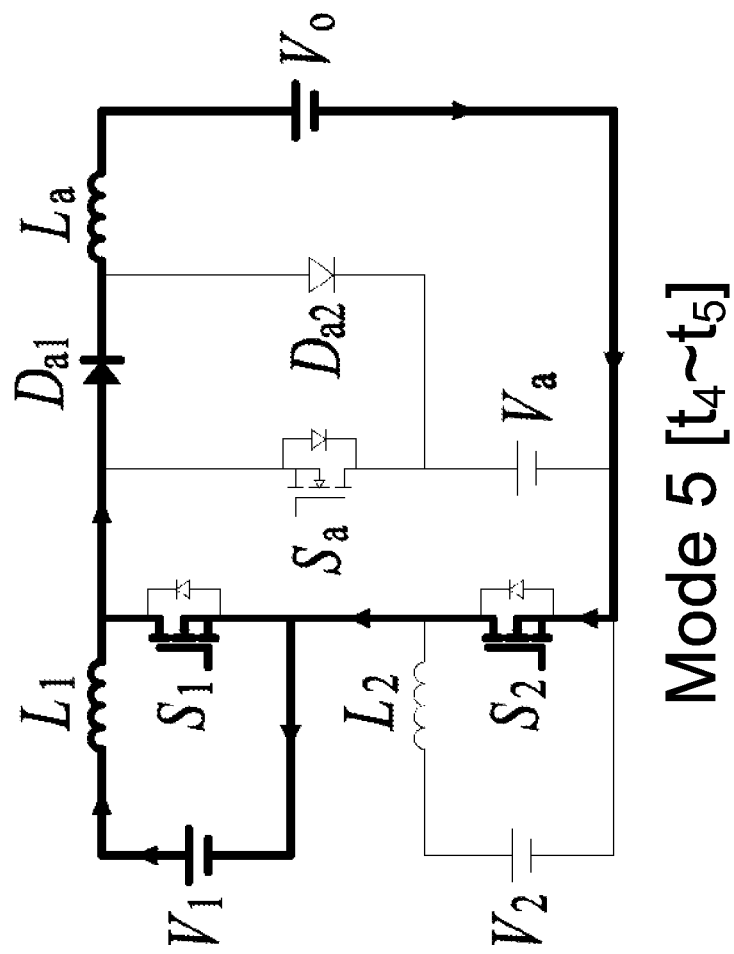
Figure 3F:
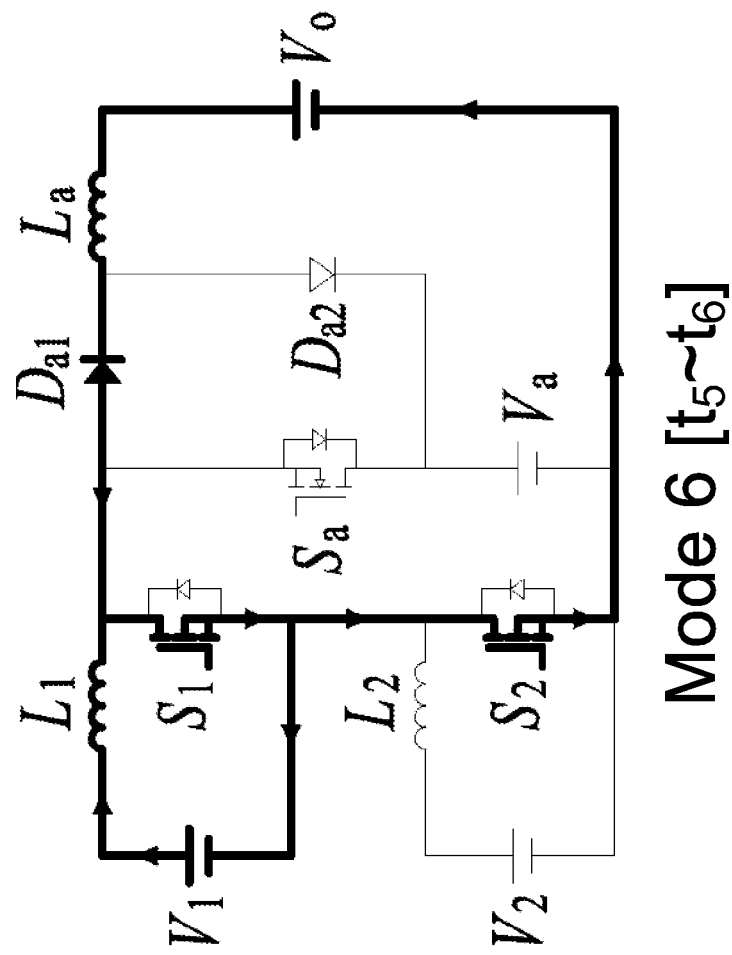
Figure 3G:
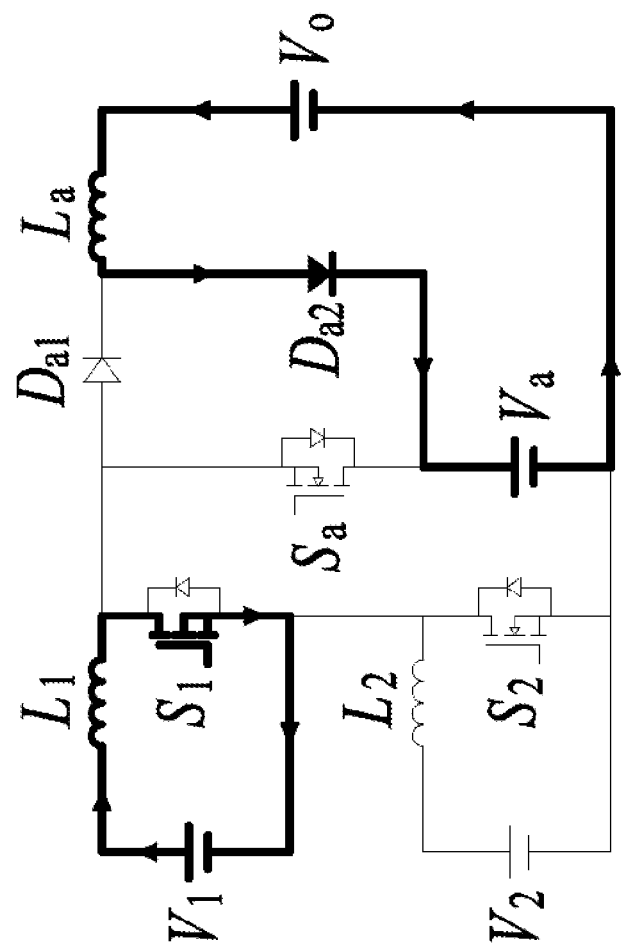

Referring to FIG. 2, there is shown a dual-source converter 1' equivalent to the dual-source converter 1. In FIG. 2, the directions of the voltage and current in every element are marked up while the closed-loop controller 109 is omitted. Referring to FIGS. 1 and 2, the operation and functions of the dual-source converter 1' will be described in detail.

Referring to FIG. 2, regarding the dual-source converter 1', there are several assumptions. At first, all of the first capacitor $C_1$, the second capacitor $C_2$, the auxiliary capacitor $C_a$ and the output capacitor $C_o$ include sufficient capacities, and are equivalent to constant voltage sources. The voltage across the auxiliary capacitor $C_a$ is the auxiliary capacitor voltage $V_a$, and the voltage across the output capacitor $C_o$ is the output voltage $V_o$. Secondly, the first switch $S_1$, the second switch $S_2$, the auxiliary switch $S_a$, the first auxiliary diode $D_{a1}$ and the second auxiliary diode $D_{a2}$ are ideal elements, and the voltages across the above-mentioned elements can be ignored when they are turned on. Thirdly, the first power-source switch $S_{p1}$ and the second power-source switch $S_{p2}$ can be ignored when they are turned on.

The operation of each of the circuits included in the dual-source converter 1' will be described later. By switching the first power switch $S_{p1}$, the first power source circuit 101 converts the first power source $V_1$ to a first inductor current $i_{L1}$, electric energy in the form of a current. By switching the second power-source switch $S_{p2}$, the second power source circuit 103 converts the second power source $V_2$ to a second inductor current $i_{L2}$, electric energy in the form of a current. The auxiliary circuit 105 stores the electric energy of the first inductor current $i_{L1}$ and the electric energy of the second inductor current $i_{L2}$ through the auxiliary capacitor $C_a$. The auxiliary inductor $L_a$ is used to release electric energy from the auxiliary capacitor $C_a$ to the output circuit 107. In the storage and release of the electric energy, flexible switching and highly efficient conversion are achieved by switching the auxiliary switch $S_a$. The voltage across the second auxiliary diode $D_{a2}$ is used to suppress the voltage across the first auxiliary diode $D_{a1}$, i.e., to suppress the first auxiliary diode voltage $v_{Da1}$. The output circuit 107 uses the output capacitor $C_o$ to receive electric energy from the auxiliary inductor $L_a$.

The closed-loop controller 109 uses the controlling circuit 1091 to receive a feedback signal $S_f$ and a command signal $S_c$ corresponding to the feedback signal $S_f$. The controlling circuit 1091 compares the feedback signal $S_f$ with the command signal $S_c$ and provides a controlling signal $S_d$ based on the comparison. The feedback signal $S_f$ is the first inductor current $i_{L1}$ from the first power source circuit 101, the second inductor current $i_{L2}$ from the second power source circuit 103, or the output voltage $V_o$ from the output circuit 107. The command signal $S_c$ is a nominal first inductor current $i'_{L1}$ (not marked up), a nominal second inductor current $i'_{L2}$ (not marked up) or a nominal output voltage $V'_o$ (not marked up).

Based on the amplitude of the controlling signal $S_d$, the driving circuit 1093 provides the first switch-driving signal $T_1$ to the first switch $S_1$, the second switch-driving signal $T_2$ to the second switch $S_2$, and the auxiliary switch-driving signal $T_a$ to the auxiliary switch $S_a$. In the preferred embodiment, the duty cycles of the first switch-driving signal $T_1$, the second switch-driving signal $T_2$ and the auxiliary switch-driving signal $T_a$ change according to the controlling signal $S_d$. The auxiliary switch-driving signal $T_a$ is the sum of a signal complementary to the first switch-driving signal $T_1$ and another signal complementary to the second switch-driving signal $T_2$. That is, if the controlling signal $S_d$ gets larger, the duty cycles of the first switch-driving signal $T_1$ and the second switch-driving signal $T_2$ while the duty cycle of the auxiliary switch-driving signal $T_a$ gets smaller. On the contrary, if the controlling signal $S_d$ gets smaller, the duty cycles of the first switch-driving signal $T_1$ and second switch-driving signal $T_2$ get shorter but the duty cycle of the auxiliary switch-driving signal $T_a$. Thus, by adjusting the boost ratio of the dual-source converter 1', the boost ratios of the control first inductor current $i_{L1}$, the second inductor current $i_{L2}$ and the output voltage $V_o$ are adjusted. The driving circuit indirectly controls the putout power of the first power source and the output power of the second power source, thus achieving the closed-loop control mechanism.

Furthermore, the driving circuit 1093 provides the first power switching signal $T_{p1}$ to the first power switch $S_{p1}$, and provides the second power-source switching signal $T_{p2}$ to the second power-source switch $S_{p2}$. Thus, by switching the control first power switch $S_{p1}$ and the second power-source switch $S_{p2}$, the dual-source converter 1' is switched between a single-source mode and a dual-source mode.

As discussed above, the operation of the dual-source converter 1' can be outlined as follows:

When the first switch $S_1$ is turned off but the second switch $S_2$ is turned on, the first inductor $L_1$ recharges the auxiliary capacitor $C_a$, the auxiliary inductor $L_a$ and the output capacitor $C_o$, and provide energy to the output load $R_o$. Meanwhile, the auxiliary switch $S_a$ is turned on. The auxiliary switch $S_a$ can be turned on at zero voltage. Then, the first inductor current $i_{L1}$ and the auxiliary capacitor voltage $V_a$ are provided to the output capacitor $C_o$, and energy is provided to the output load $R_o$.

Similarly, when the first switch $S_1$ is turned on but the second switch $S_2$ is turned off, the second inductor $L_2$ recharges the auxiliary capacitor $C_a$, the auxiliary inductor $L_a$ and the capacitor $C_o$, and provides energy to the output load $R_o$. Meanwhile, the auxiliary switch $S_a$ is turned on. The auxiliary switch $S_a$ can be turned on at zero voltage. Then, the second inductor current $i_{L2}$ and the auxiliary capacitor voltage $V_a$ are provided to the output capacitor $C_o$, and energy is provided to the output load $R_o$. The first inductor current $i_{L1}$ and the second inductor current $i_{L2}$ recharge the output circuit 107 sequentially.

Moreover, when both of the first switch $S_1$ and the second switch $S_2$ are turned on, the first power source $V_1$ and the second power source $V_2$ recharge the first inductor $L_1$ and the second inductor $L_2$, respectively. The auxiliary inductor current $i_{La}$ recharges the output capacitor $C_o$ of the output circuit 107, and provides energy to the output load $R_o$ continuously. The auxiliary inductor current $i_{La}$ decreases to zero eventually.

According to the preferred embodiment of the present invention, the dual-source converter 1' is switched between the single-source mode and the dual-source mode based on the type of an actual load and the state of the supply of energy. The operations of in the two modes will be described later.

Figure 4:
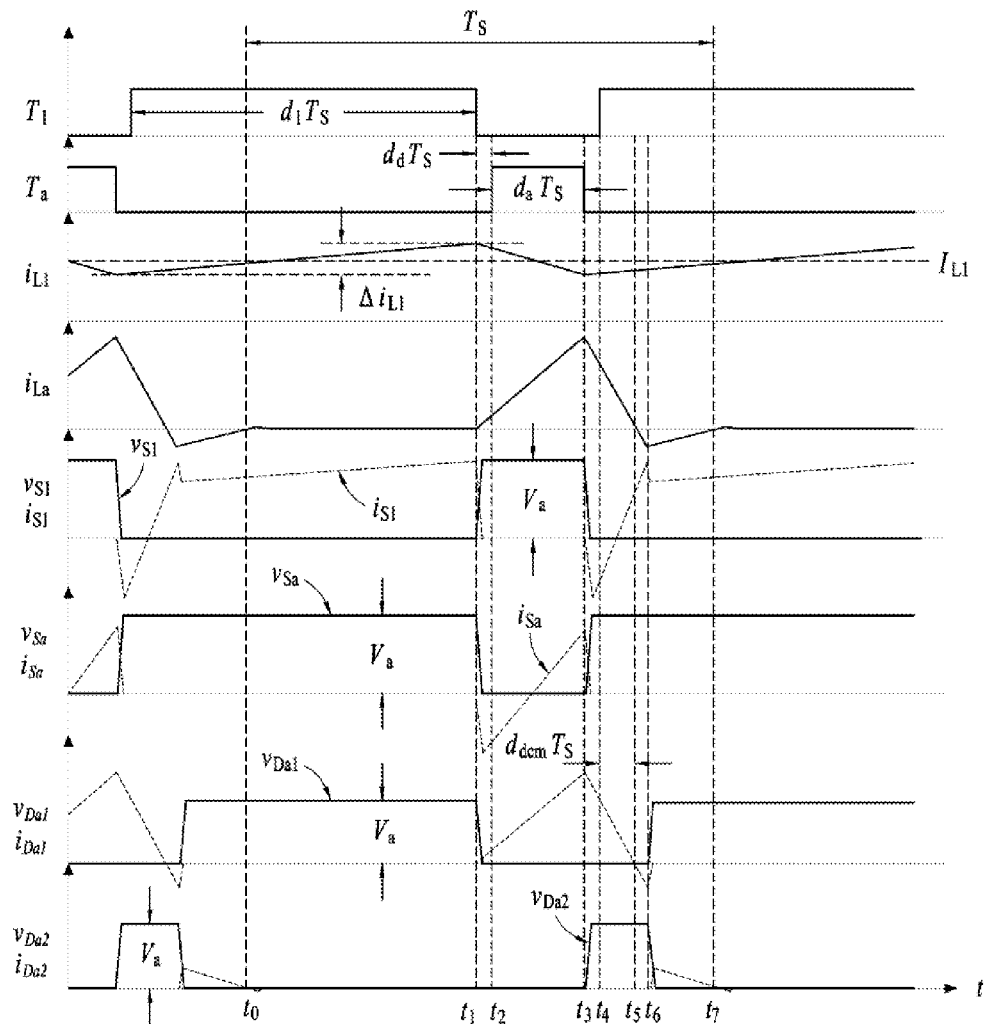
FIG. 4 shows the waveforms of various signals of the dual-source converter in the single-source mode shown in FIGS. 3A-3G versus time.

Referring to FIGS. 3A-3G, the dual-source converter 1' is operated in the single-source mode. Referring to FIG. 4, the waveforms of the signals versus time are shown.

Referring to FIGS. 3A-3G, when the second power source $V_2$ fails, or for the purpose of responding to different output loads, or for the purpose of saving energy, it might be desired to stop the second power source $V_2$ from providing power. To this end, the second power sources witch $S_{p2}$ is turned off to cut off the second power source $V_2$, and to keep the second switch $S_2$ on. Now, the dual-source converter 1' is operated in the single-source mode for using the first power source $V_1$ only.

At first, there are defined the switching cycle $T_s$ of the switches, the duty cycle $d_1$ of the first switch, the duty cycle $d_a$ of the auxiliary switch, the duty cycle $d_{dcm}$ of the discontinuous mode and the duty cycle $d_d$ of the dead zone time.

Mode 1 [$t_0$~$t_1$]

As $t=t_0$, the auxiliary inductor current $i_{La}$ is returned to zero. Now, the first switch $S_1$ is turned on but the auxiliary switch $S_a$ is turned off. The first power source $V_1$ recharges the first inductor $L_1$.

Mode 2 [$t_1$~$t_2$]

As $t=t_1$, the first switch $S_1$ is turned off, and the first switch voltage $v_{S1}$ is increased to the auxiliary capacitor voltage $V_a$. Now, the auxiliary switch $S_a$ is still on. The first inductor current $i_{L1}$ continues to travel through the parasitic diode of the auxiliary switch $S_a$, and recharges the auxiliary capacitor $C_a$. Now, the auxiliary switch current $i_{Sa}$ is negative, and the voltage $v_{La}$ across the auxiliary inductor is $V_a-V_o$, and the auxiliary inductor current $i_{La}$ is increased from zero linearly. Then, the first auxiliary diode $D_{a1}$ is turned on.

Mode 3 [$t_2$~$t_3$]

As $t=t_2$, the auxiliary switch current $i_{Sa}$ is still negative. Now, the auxiliary switch $S_a$ is turned on at zero voltage. After the auxiliary switch $S_a$ is turned on, a positive-directional path is provided to the auxiliary switch current $i_{Sa}$. When the auxiliary inductor current $i_{La}$ is increased to a value larger than the first inductor current $i_{L1}$, the auxiliary switch current $i_{La}$ is positive. Now, energy is released from the auxiliary capacitor voltage $V_a$ to the auxiliary inductor $L_a$ and the output voltage $V_o$. In Modes 2 and 3, $t=t_1$~$t_3$, the time can be represented by $(d_d+d_a)T_s$. In these modes, the voltage $v_{La}$ across the auxiliary inductor is $V_a-V_o$, and the voltage $v_{L1}$ across the first inductor is $V_1-V_a$. Hence, the auxiliary inductor current $i_{La}$ and the first inductor current $i_{L1}$ can be represented by Equations (1) and (2) as follows:

$$i_{La}(t)=(V_a-V_o)(t-t_1)/L_a \qquad (1)$$

$$i_{L1}(t)=(I_{L1}+0.5\Delta i_{L1})+(V_1-V_a)(t-t_1)L_1 \qquad (2)$$

wherein $I_{L1}$ represents the average value of the first inductor current $i_{L1}$, and $\Delta i_{L1}$ represents the ripple of the first inductor current $i_{L1}$. As $t=t_3$, the maximum value of the auxiliary inductor current $i_{La}$ is represented by Equation (3) as follows $$i_{La}(t_3)=(V_a-V_o)(d_d+d_a)T_s/L_a \qquad (3)$$

According to the voltage $v_{L1}$ across the first inductor, $\Delta i_{L1}$ can be rewritten to be Equation (4) as follows:

$$\Delta i_{L1}=(V_a-V_1)(d_d+d_a)T_s/L_1 \qquad (4)$$

Mode 4 [$t_3$~$t_4$]

As $t=t_3$, the auxiliary switch $S_a$ is turned off but the first switch $S_1$ is kept on. Because the auxiliary inductor current $i_{La}$ must continue to travel and the auxiliary inductor current $i_{La}$ is larger than the first inductor current $i_{L1}$, the first switch voltage $v_{S1}$ is reduced to zero before the parasitic diode of the first switch $S_1$ is turned on to receive the difference between the auxiliary inductor current $i_{La}$ and the first inductor current $i_{L1}$. The first diode current $i_{Da1}$ is identical to the auxiliary inductor current $i_{La}$. The auxiliary inductor $L_a$ begins to provide electricity to the output voltage $V_o$. Now, the voltage $v_{La}$ across the auxiliary inductor is $-V_o$, the auxiliary inductor current $i_{La}$ is decreased from the local maximum value linearly.

Mode 5 [$t_4$~$t_5$]

As $t=t_4$, the parasitic diode of the first switch $S_1$ is turned on, and the first switch $S_1$ is turned on at zero voltage. Now, the first power source $V_1$ recharges the first inductor $L_1$, and the first switch current $i_{S1}$ is increased from a negative value to a positive value eventually, and the auxiliary inductor current $i_{La}$ continues to provide electricity to the voltage $V_o$. In Modes 4 and 5, $t=t_3$~$t_5$, time can be represented by $(d_d+d_{dcm})T_s$. In these modes, the voltage $v_{La}$ across the auxiliary inductor is $-V_o$, and the voltage $v_{L1}$ across the first inductor is $V_1$. Therefore, the auxiliary inductor current $i_{La}$ can be represented by Equation (5) as follows:

$$i_{La}(t)=[(V_a-V_o)(d_d+d_a)T_s-V_o(t-t_3)]/L_a \quad (5)$$

Mode 6 [$t_5 \sim t_6$]

As $t=t_5$, the auxiliary inductor current $i_{La}$ is reduced to zero, $i_{La}(t_5)=0$ is substituted in Equation (5) to provide the relationship between the auxiliary capacitor voltage $V_a$ and the output voltage $V_o$ represented by Equation (6) as follows:

$$(V_a-V_o)(d_d+d_a)=V_o(d_d+d_{dcm}) \quad (6)$$

Because auxiliary inductor current $i_{La}$ provided from the auxiliary inductor $L_a$ to the output voltage $V_o$ is reduced to zero, there is reverse recovery current in the first auxiliary diode $D_{a1}$, and the output voltage $V_o$ recharges the parasitic capacitor of the first auxiliary diode $D_{a1}$ through the auxiliary inductor $L_a$.

Mode 7 [$t_6 \sim t_7$]

As $t=t_6$, the first auxiliary diode $D_{a1}$ builds a reverse-biased voltage. Then, the auxiliary inductor current $i_{La}$ must continue to travel to the auxiliary capacitor $C_a$ through the second auxiliary diode $D_{a2}$, to complete a cycle of the operation of the first power source $V_1$ in the single-source mode.

It should be noted that the second auxiliary diode $D_{a2}$ provides a path with little loss in turning on, to reduce the current that travels through the parasitic diode of the auxiliary switch $S_a$ to protect the auxiliary switch $S_a$. Thus, a high-voltage surge that could be caused by the resonance of a parasitic capacitor of a power semiconductor element with a leak capacitor is avoided so that the power semiconductor is protected.

According to volt-second balance theory, in a cycle of the operation of the first power source $V_1$ in the single-source mode, the average of the voltage $v_{L1}$ across the first inductor is zero, and their relationship can be represented by Equations (7a) and (7b) as follows:

$$[V_1(d_1+d_d)+(V_1-V_a)(d_a+d_d)]T_s=0 \quad (7a)$$

$$V_a=V_1/(d_a+d_d) \quad (7b)$$

According to Equations (6) and (7b), and it is assumed that the duty cycle $d_d$ of the dead zone time is short, the sum of the duty cycle $d_1$ of the first switch and the duty cycle $d_a$ of the auxiliary switch is close to 1, and Equations (6) and (7b) can respectively be rewritten to be Equations (8a) and (8b) as follows:

$$V_o=V_a(1-d_1)/(1+d_{dcm}-d_1) \quad (8a)$$

$$V_a=V_1/(1-d_1) \quad (8b)$$

In consideration that the average current of the output capacitor $C_o$ in all of the switch cycles is zero to retain the stability of the output voltage $V_o$, and the average current of the output capacitor $C_o$ is identical to the average current $L_a$ of the auxiliary inductor, and with an assumption that reverse recovery current caused by the first auxiliary diode $D_{a1}$ in Mode 7 is very small and can be ignored, this relationship can be represented by Equation (9) as follows:

$$(1-d_1)(1-d_1+d_{dcm})(V_a-V_o)T_s/2L_a=V_o/R_o \quad (9)$$

The duty cycle $d_{dcm}$ of the non-continuous current mode and the output voltage $V_o$ can respectively be derived from Equations (8) and (9) and represented by Equations (10a) and (10b) as follows:

$$d_{dcm} = 0.5(1-d_1)\left[\sqrt{1+\frac{8L_a}{R_o T_s(1-d_1)^2}} - 1\right] \quad (10a)$$

$$V_o = 2V_1 / \left\{(1-d_1)\left[1+\sqrt{1+\frac{8L_a}{R_o T_s(1-d_1)^2}}\right]\right\} \quad (10b)$$

Similarly, when the first power source $V_1$ fails, or when the first power source $V_1$ is instructed not to provide power in response to a different output load $R_o$ and for saving energy, the first power witch $S_{p1}$ is turned off to cut off the first power source $V_1$, and the first switch $S_1$ is kept on. Now, the dual-source converter 1' can be switched to a mode wherein the second power source $V_2$ alone provides electricity.

The mode wherein the second power source $V_2$ alone provides electricity is identical to the mode wherein the first power source $V_1$ alone provides electricity. Thus, based on the foregoing theory, the relationship between the voltages can be represented by Equations (11a) and (11b) as follows:

$$d_{dcm} = 0.5(1-d_2)\left[\sqrt{1+\frac{8L_a}{R_o T_s(1-d_2)^2}} - 1\right] \quad (11a)$$

$$V_o = 2V_2 / \left\{(1-d_2)\left[1+\sqrt{1+\frac{8L_a}{R_o T_s(1-d_2)^2}}\right]\right\} \quad (11b)$$

wherein $d_2$ represents the duty cycle of the second switch. As discussed above, the dual-source converter 1' can achieve the goal of energy convention with highly efficient boost through the duty cycles $d_1$, $d_2$ and $d_a$ of the first switch $S_1$, the second switch $S_2$ and the auxiliary switch $S_a$, respectively.

Figure 5A:
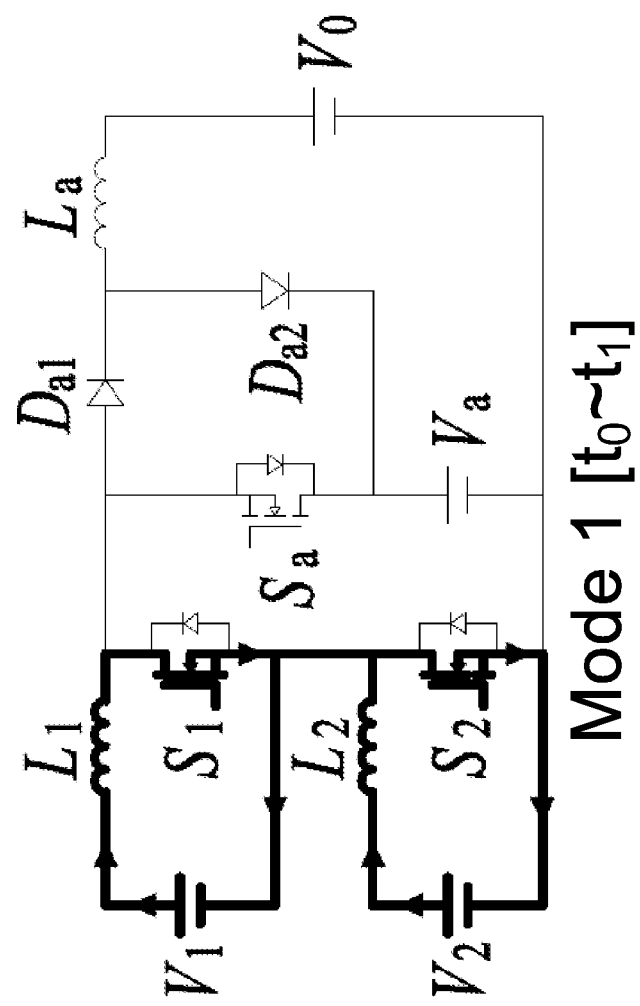
FIGS. 5A-5N shows the dual-source converter shown in FIG. 1, in a dual-source mode.
Figure 5B:
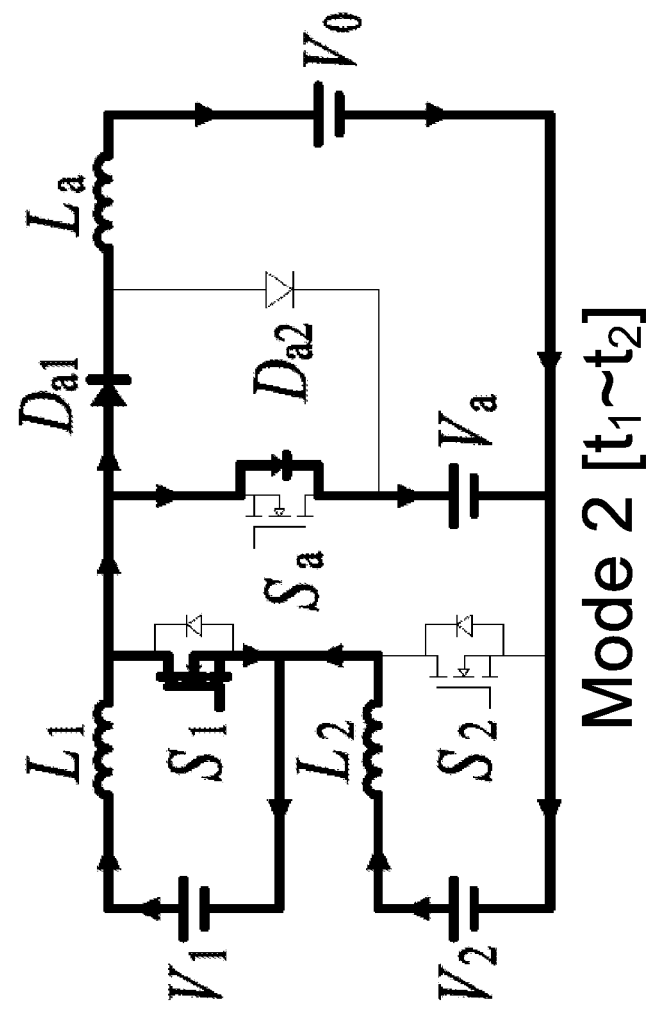
Figure 5C:
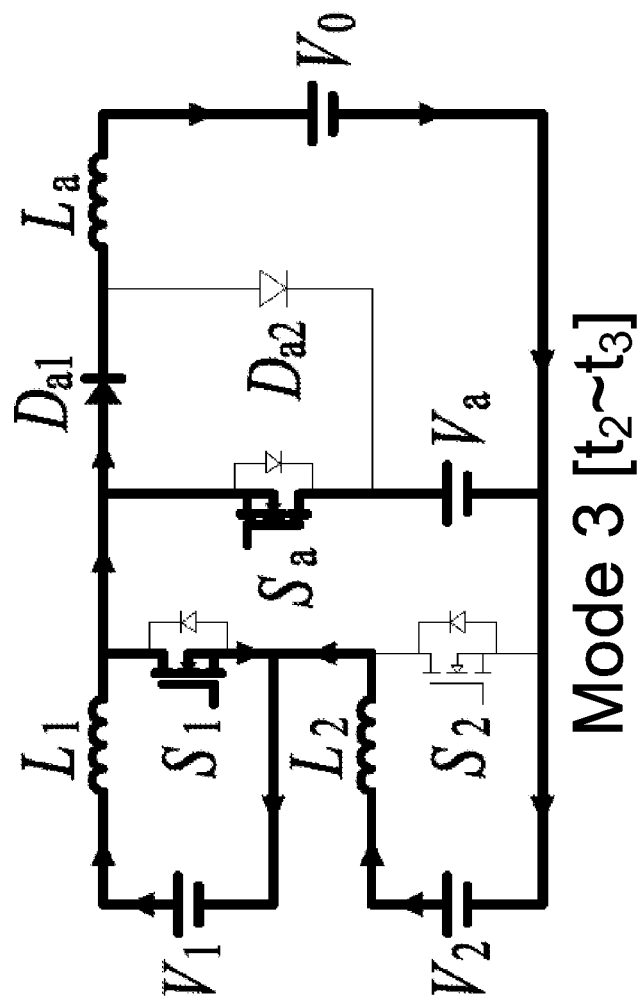
Figure 5D:
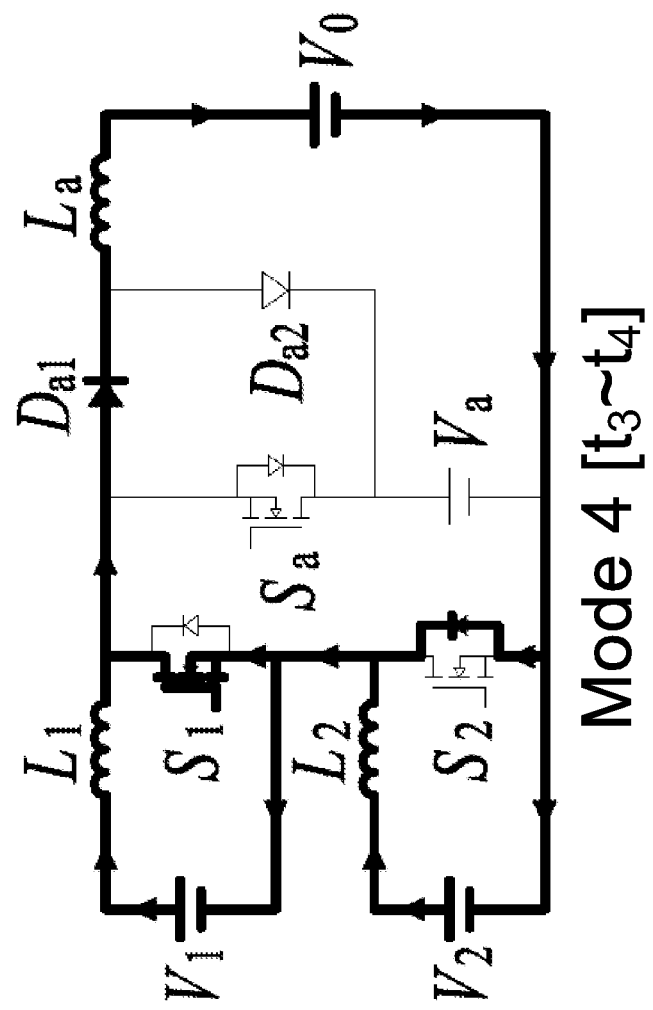
Figure 5E:
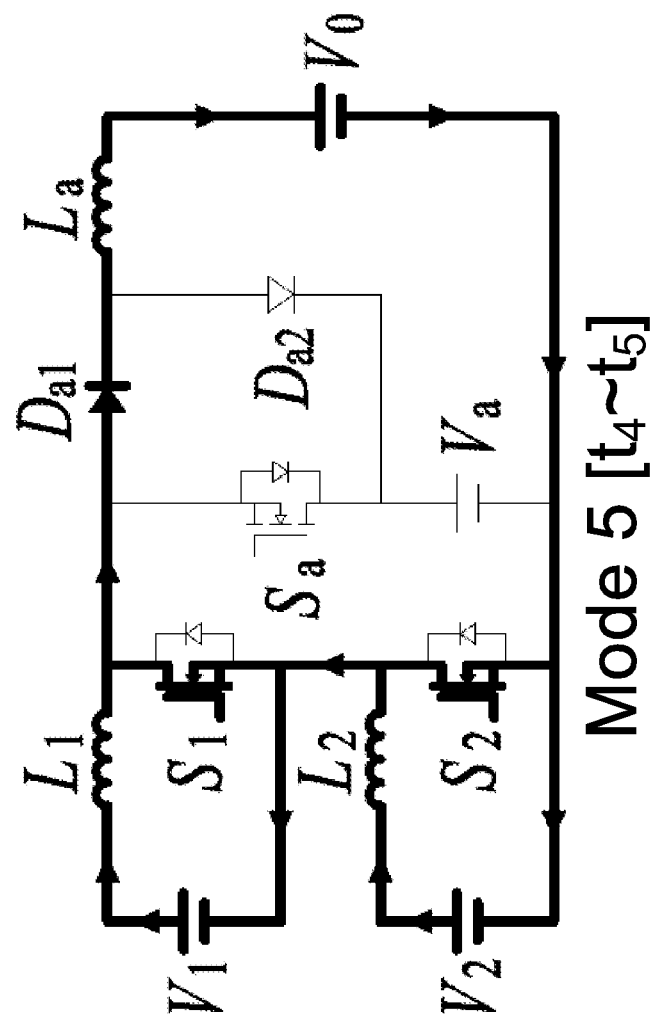
Figure 5F:
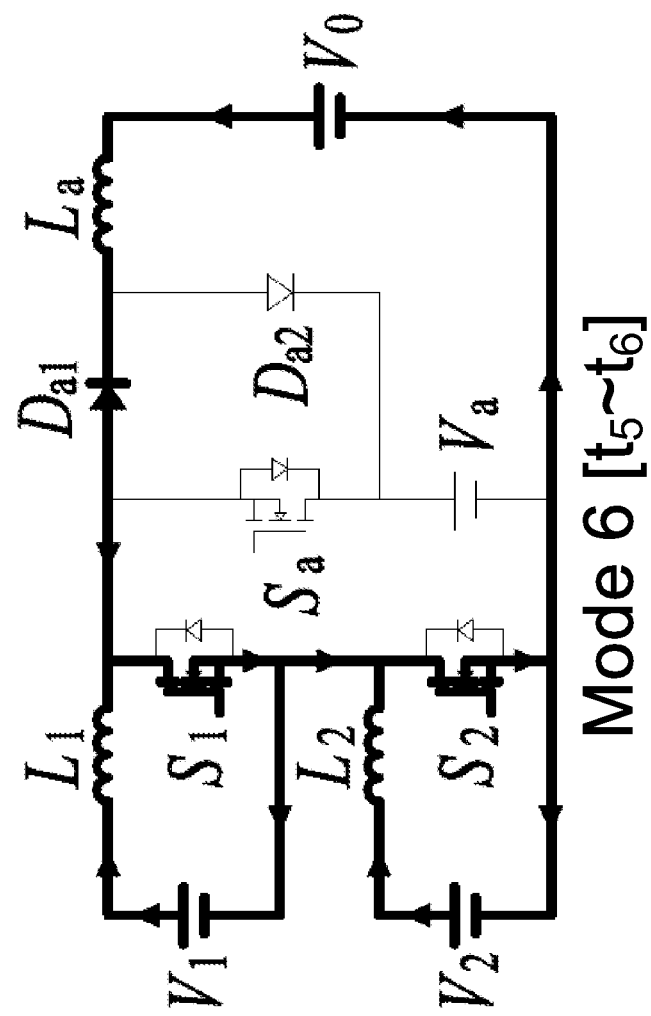
Figure 5G:
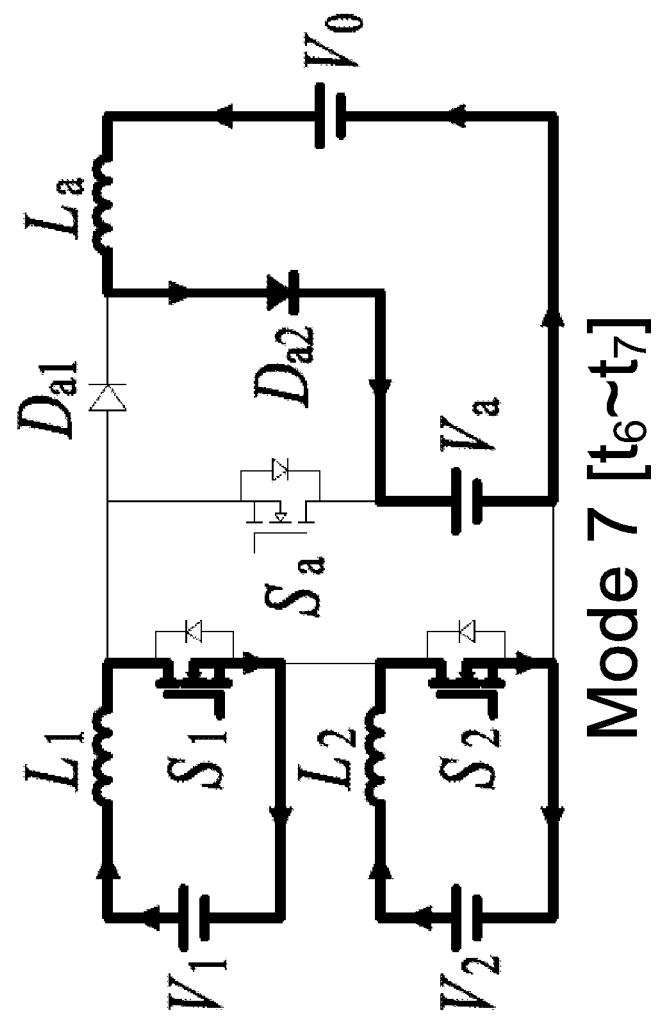
Figure 5H:
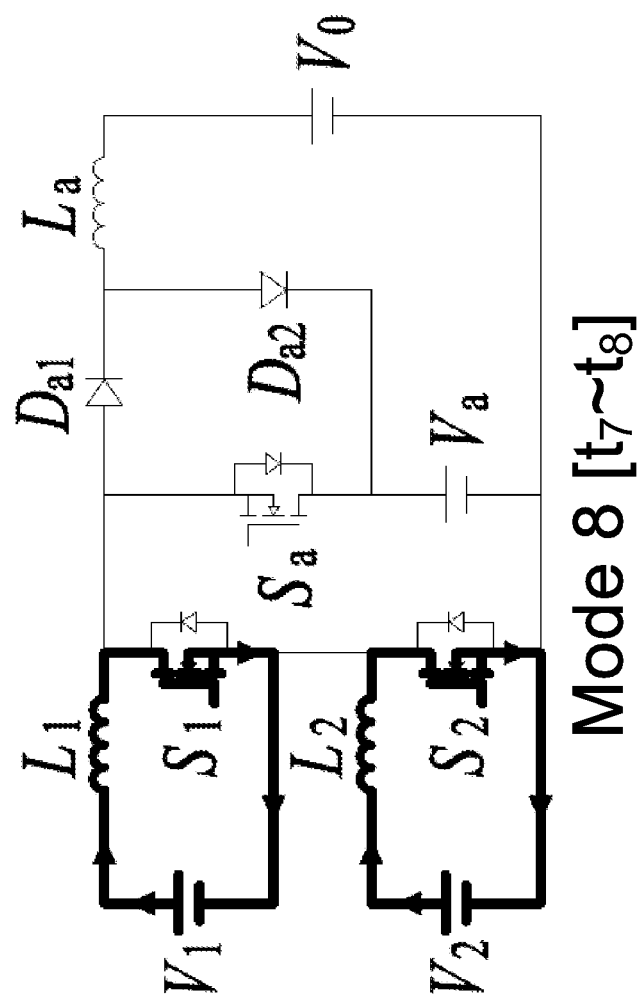
Figure 5I:
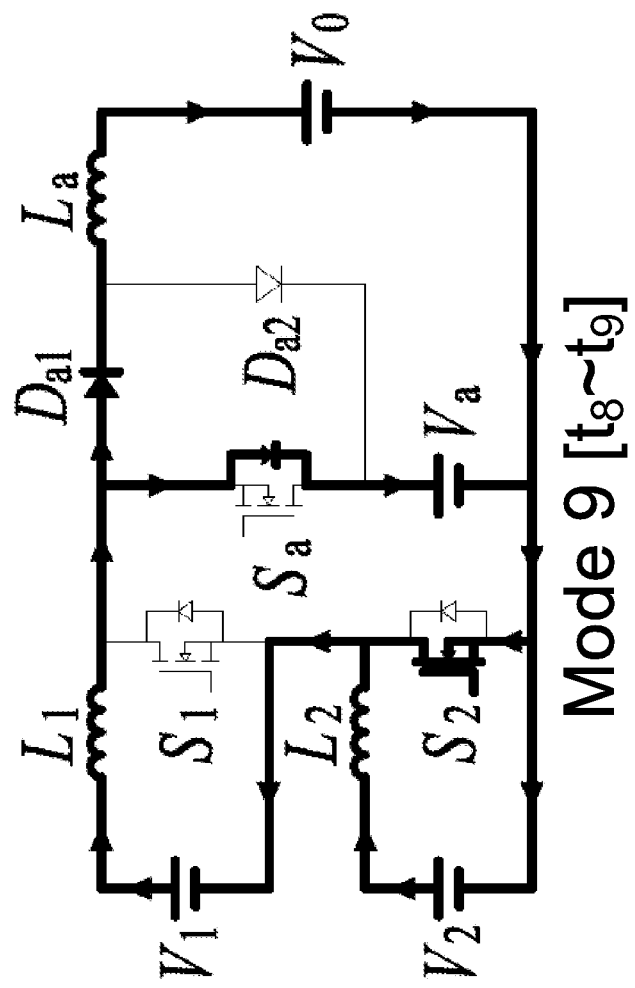
Figure 5J:
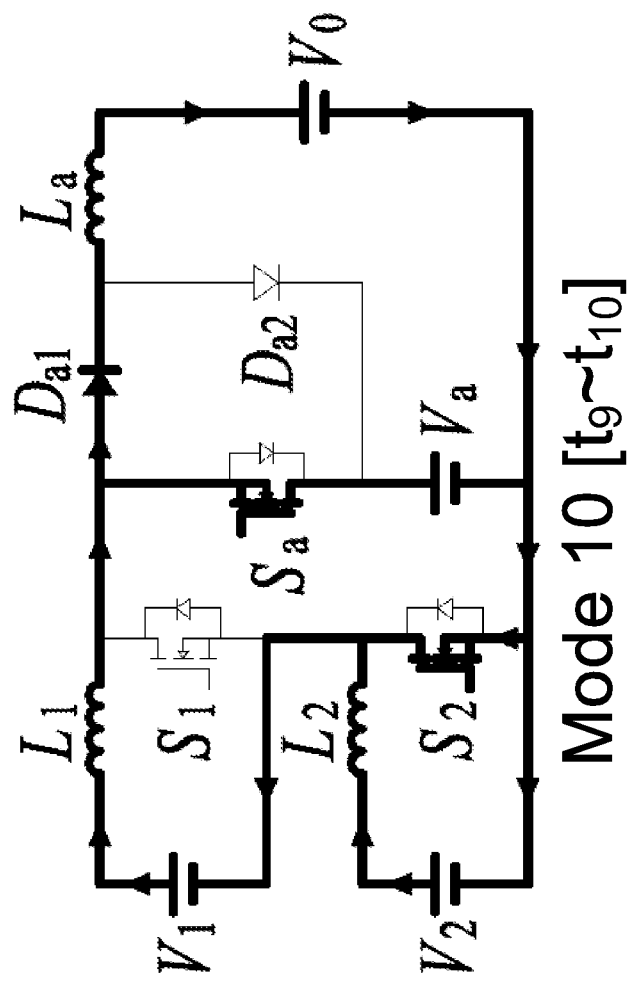
Figure 5K:
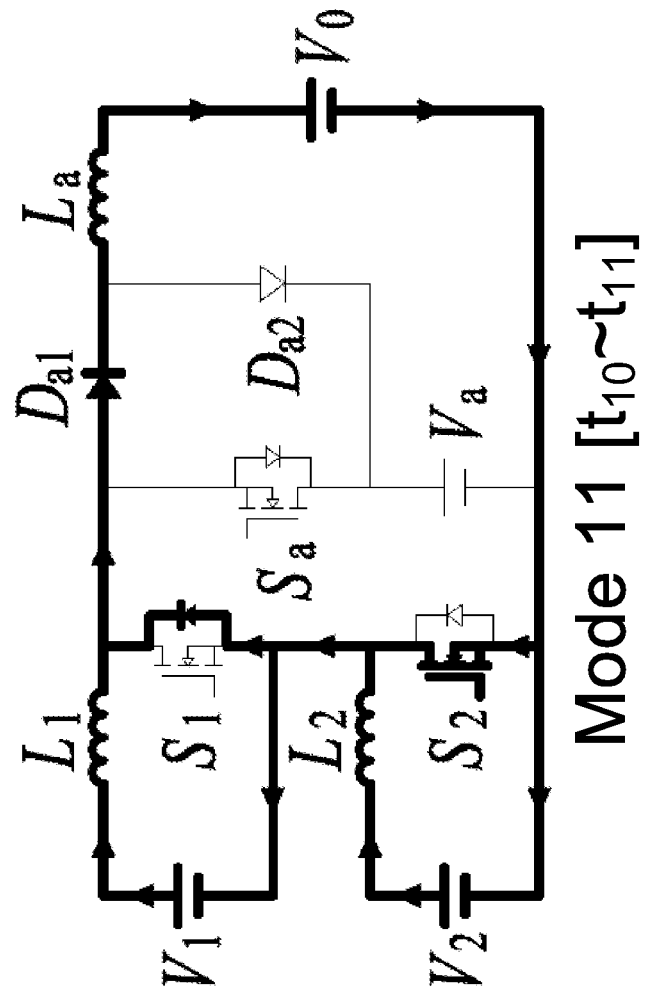
Figure 5L:
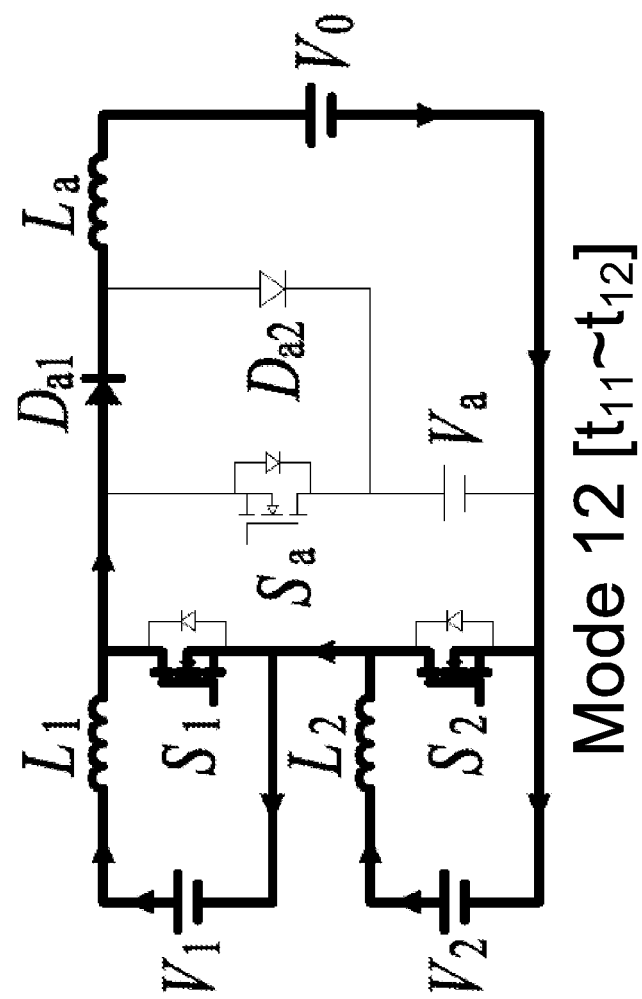
Figure 5M:
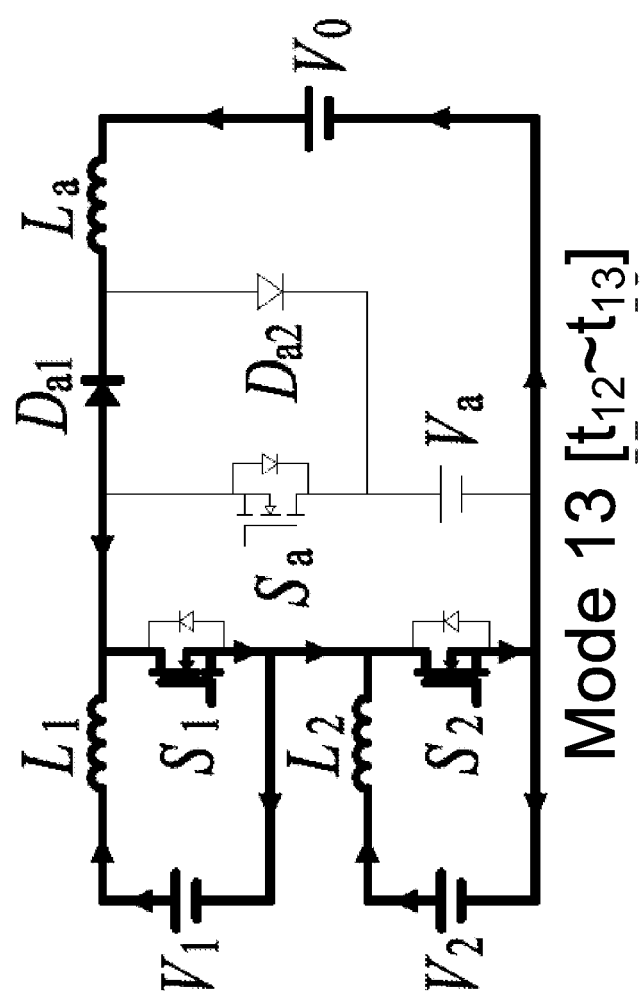
Figure 5N:
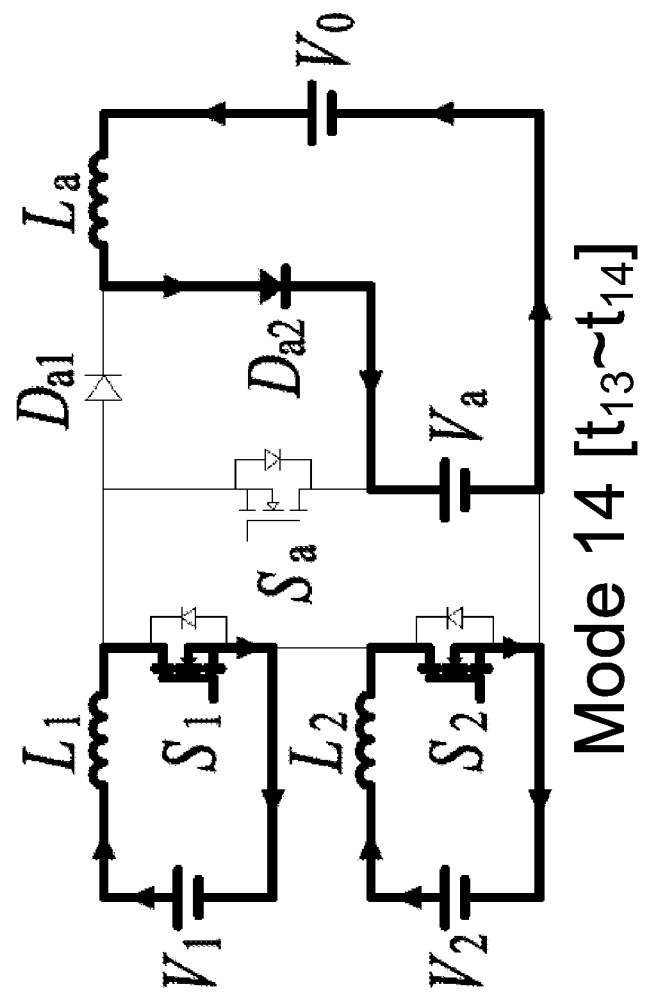
Figure 6:
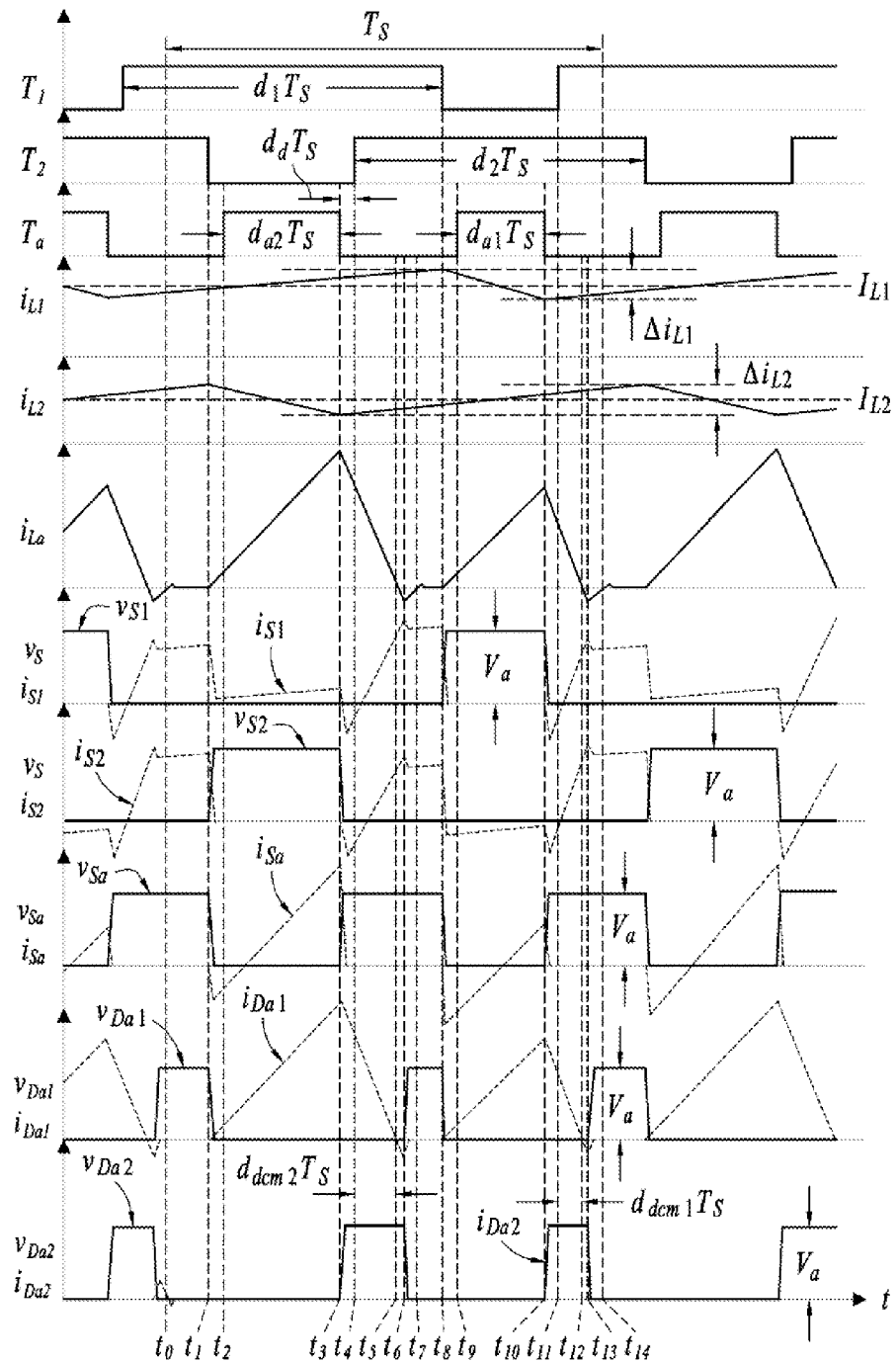
FIG. 6 shows the waveforms of various signals of the dual-source converter in the dual-source mode shown in FIGS. 5A-5N versus time.

Subsequently, referring to FIGS. 5A-5N, the dual-source converter is in the dual-source mode wherein both of the first and second power sources are used. Referring to FIG. 6, the waveforms of various signals of the dual-source converter in the dual-source mode are shown.

It should be noted that FIGS. 5 and 6 are based on a condition that the first inductor current $i_{L1}$ is larger than second inductor current $i_{L2}$. At first, there are defined the first auxiliary switch duty cycle $d_{a1}$, the second auxiliary switch duty cycle $d_{a2}$, the first non-continuous current mode duty cycle $d_{dcm1}$, the second non-continuous current mode duty cycle $d_{dcm2}$, the switch cycle $T_s$, the first switch duty cycle $d_1$, the second switch duty cycle $d_2$, the auxiliary switch duty cycle $d_a$ and the dead zone duty cycle $d_d$.

Moreover, the dual-source converter 1' is in the dual-source mode on a condition that the sum of the first switch duty cycle $d_1$ and the second switch duty cycle $d_2$ is greater than 1. That is, $d_1+d_2 \geq 1$. This is to prevent a path of the first inductor current $i_{L1}$ connected in series to the second inductor current $i_{L2}$ when both of the first switch $S_1$ and the second switch $S_2$ are turned off.

Mode 1 [$t_0 \sim t_1$]

As $t=t_0$, the auxiliary inductor current $i_{La}$ is returned to zero. Now, both of the first switch $S_1$ and the second switch $S_2$ are turned on but the auxiliary switch $S_a$ is turned off. The first power source $V_1$ and the second power source $V_2$ recharge the first inductor $L_1$ and the second inductor $L_2$, respectively.

Mode 2 [$t_1 \sim t_2$]

As $t=t_1$, the second switch $S_2$ is turn off, and the second switch voltage $v_{S2}$ is increased to the auxiliary capacitor voltage $V_a$. Now, the auxiliary switch $S_a$ is still off. The second inductor current $i_{L2}$ continues to travel to the first power source circuit 101 and the parasitic diode of the auxiliary switch $S_a$ and recharges the auxiliary capacitor $C_a$. Now, the auxiliary switch current $i_{Sa}$ is negative, and the voltage $v_{La}$ across the auxiliary inductor is $V_a-V_o$. The auxiliary inductor current $i_{La}$ is increased from zero. The first auxiliary diode $D_{a1}$ is turned on accordingly.

Mode 3 [$t_2$~$t_3$]

As $t=t_2$, the auxiliary switch current $i_{Sa}$ is still negative. Now, the auxiliary switch $S_a$ is turned on at zero voltage. Once turned on, the auxiliary switch $S_a$ provides a path in a positive direction for the auxiliary switch current $i_{Sa}$. When the auxiliary inductor current $i_{La}$ is increased linearly so that it is larger than the second inductor current $i_{L2}$, the auxiliary switch current $i_{Sa}$ is positive. Now, energy of the auxiliary capacitor voltage $V_a$ is released from to the auxiliary inductor $L_a$ and the output voltage $V_o$. In Modes 2 and 3, $t=t_1$~$t_3$, time can be represented by $(d_d+d_{a2})T_s$. In these modes, the voltage $v_{La}$ across the auxiliary inductor is $V_a-V_o$. The voltage across the second inductor is $V_2-V_a$. Hence, the auxiliary inductor current $i_{La}$ and the second inductor current $i_{L2}$ can respectively be represented by Equations (12) and (13) as follows:

$$i_{La}(t)=(V_a-V_o)(t-t_1)/L_a \qquad (12)$$

$$i_{L2}(t)=(I_{L2}+0.5\Delta i_{L2})+(V_2-V_a)(t-t_1)/L_2 \qquad (13)$$

wherein $I_{L2}$ represents the average value of the second inductor current $i_{L2}$, and $\Delta i_{L2}$ represents the ripple of the second inductor current $i_{L2}$. As $t=t_3$, the maximum value of the auxiliary inductor current $i_{La}$ can be represented by Equation (14) as follows:

$$i_{La}(t_3)=(V_a-V_o)(d_d+d_{a2})T_s/L_a \qquad (14)$$

Based on the voltage $v_{L2}$ across the second inductor, $\Delta i_{L2}$ can be represented by Equation (15) as follows:

$$\Delta i_{L2}=(V_a-V_2)(d_d+d_{a2})T_s/L_2 \qquad (15)$$

Moreover, in Modes 2 and 3, $t=t_1$~$t_3$, the first switch current $i_{S1}$ can be represented by $i_{L1}-i_{L2}$. Because the first inductor current $i_{L1}$ is larger than the second inductor current $i_{L2}$, the first switch current $i_{S1}$ is positive. Because the loss of the switch in turning on is positively proportional to the square of the current that travels through it, the first switch $S_1$ is connected, in series, to the second switch $S_2$ to considerably reduce such loss in the present invention.

Mode 4 [$t_3$~$t_4$]

As $t=t_3$, the auxiliary switch $S_a$ is turned off. Because the auxiliary inductor current $i_{La}$ must continue to travel and the auxiliary inductor current $i_{La}$ is larger than the second inductor current $i_{L2}$, the second switch voltage $v_{S2}$ is reduced to zero before the parasitic diode of the second switch $S_2$ is turned on. The local maximum value of the auxiliary inductor current $L_a$ beings to drop linearly.

Mode 5 [$t_4$~$t_5$]

As $t=t_4$, wherein the parasitic diode of the second switch $S_2$ is turned on, the second switch $S_2$ is turned on at zero voltage. Now, the second switch current $i_{S2}$ is increased from zero to positive eventually. In Modes 4 and 5, $t=t_3$~$t_5$, time can be represented by $(d_d+d_{dcm2})T_s$. In these modes, the voltage $v_{La}$ across the auxiliary inductor is $-V_o$. Hence, the auxiliary inductor current $i_{La}$ can be represented by Equation (16) as follows:

$$i_{La}(t)=[(V_a-V_o)(d_d+d_{a2})T_s-V_o(t-t_3)]/L_a \qquad (16)$$

Mode 6 [$t_5$~$t_6$]

As $t=t_5$, the auxiliary inductor current $i_{La}$ is reduced to zero. The condition that $i_{La}(t_5)=0$ is included in Equation (16) to provide the relationship between the auxiliary capacitor voltage $V_a$ and the output voltage $V_o$ by Equation (17) as follows:

$$(V_a-V_o)(d_d+d_{a2})=V_o(d_d+d_{dcm2}) \qquad (17)$$

Because the auxiliary inductor current $i_{La}$ provided from the auxiliary inductor $L_a$ to the output voltage $V_o$ is reduced to zero, there is reverse recovery current in the first auxiliary diode $D_{a1}$. The output voltage $V_o$ recharges the parasitic capacitor of the first auxiliary diode $D_{a1}$ through the auxiliary inductor $L_a$.

Mode 7 [$t_6$~$t_7$]

As $t=t_6$, the first auxiliary diode $D_{a1}$ builds a reverse-biased voltage. Then, the auxiliary inductor current $i_{La}$ must continue to travel to the auxiliary capacitor $C_a$ through the second auxiliary diode $D_{a2}$.

Mode 8 [$t_7$~$t_8$]

As $t=t_7$, the auxiliary inductor current $i_{La}$ is returned to zero. Now, the operation of the dual-source power source converter 1' is identical to the operation in Mode 1.

Mode 9 [$t_8$~$t_9$]

As $t=t_8$, the first switch $S_1$ is turned off. Now, the auxiliary switch $S_a$ is still off. The first inductor current $i_{L1}$ continues to travel through the second power source circuit 103 and the parasitic diode of the auxiliary switch $S_a$ and recharges the auxiliary capacitor $C_a$. Now, the auxiliary switch current $i_{Sa}$ is negative, and the voltage $v_{La}$ across the auxiliary inductor is $V_a-V_o$, and the auxiliary inductor current $i_{La}$ is increased from zero linearly, and the first auxiliary diode $D_{a1}$ is turned on accordingly.

Mode 10 [$t_9$~$t_{10}$]

As $t=t_9$, the auxiliary switch current $i_{Sa}$ is still negative. Now, the auxiliary switch $S_a$ is turned on at zero voltage. Once turned on, the auxiliary switch $S_a$ provides a path in a positive direction for the auxiliary switch current $i_{Sa}$. When the auxiliary inductor current $i_{La}$ is increased linearly so that it is larger than the first inductor current $i_{L1}$, the auxiliary switch current $i_{Sa}$ is positive. Now, the energy of the auxiliary capacitor voltage $V_a$ is released to the auxiliary inductor $L_a$ and the voltage $V_o$. In Modes 9 and 10, $t=t_8$~$t_{10}$, time can be represented by $(d_d+d_{a1})T_s$. In these modes, the voltage $v_{La}$ across the auxiliary inductor is $V_a-V_o$, and the voltage across the first inductor is $V_1-V_a$. Hence, the auxiliary inductor current $i_{La}$ and the first inductor current $i_{L1}$ can respectively be represented by Equations (18) and (19) as follows:

$$i_{La}(t)=(V_a-V_o)(t-t_8)/L_a \qquad (18)$$

$$i_{L1}(t)=(I_{L1}+0.5\Delta i_{L1})+(V_1-V_a)(t-t_8)/L_1 \qquad (19)$$

As $t=t_{10}$, the local maximum value of the auxiliary inductor current $i_{La}$ can be represented by Equation (20):

$$i_{La}(t_{10})=(V_a-V_o)(d_d+d_{a1})T_s/L_a \qquad (20)$$

According to the voltage $v_{L1}$ across the first inductor, $\Delta i_{L1}$ can be represented by Equation (21) as follows:

$$\Delta i_{L1}=(V_a-V_1)(d_d+d_{a1})T_s/L_1 \qquad (21)$$

Mode 11 [$t_{10}$~$t_{11}$]

As $t=t_{10}$, the auxiliary switch $S_a$ is turned off. Because the auxiliary inductor current $i_{La}$ must continue to travel and the auxiliary inductor current $i_{La}$ is larger than the first inductor current $i_{L1}$, the first switch voltage $v_{S1}$ is reduced to zero before the parasitic diode of the first switch $S_1$ is turned on, and the local maximum value of the auxiliary inductor current $i_{La}$ begins to drop linearly.

Mode 12 [$t_{11}$~$t_{12}$]

As $t=t_{11}$, when the parasitic diode of the first switch $S_1$ is turned on, the first switch $S_1$ is turned on at zero voltage. Now, the first switch current $i_{S1}$ is increased from negative to positive eventually. In Modes 11 and 12, $t=t_{10}$~$t_{12}$, time can be represented by $(d_d+d_{dcm1})T_s$. In these modes, the voltage $v_{La}$ across the auxiliary inductor is $-V_o$. Hence, the auxiliary inductor current $i_{La}$ can be represented by Equation (22) as follows:

$$i_{La}(t)=[(V_a-V_o)(d_d+d_{a1})T_s-V_o(t-t_{10})]/L_a \qquad (22)$$

Mode 13 [$t_{12}$~$t_{13}$]

As $t=t_{12}$, the auxiliary inductor current $i_{La}$ is reduced to zero. A condition that $i_{La}(t_{12})=0$ is included in Equation (22) to provided the relationship between the capacitor voltage $V_a$ and the output voltage $V_o$ represented by Equation 23 as follows:

$$(V_a-V_o)(d_d+d_{a1})=V_o(d_d+d_{cm1}) \qquad (23)$$

Because the auxiliary inductor current provided from the auxiliary inductor $L_a$ to the output voltage $V_o$ is reduced to zero, there is reverse recovery current in the first auxiliary diode $D_{a1}$. The output voltage $V_o$ recharges the parasitic capacitor of the first auxiliary diode $D_{a1}$ through the auxiliary inductor $L_a$.

Mode 14 [$t_{13}$~$t_{14}$]

As $t=t_{13}$, the first auxiliary diode builds a reverse-biased voltage. Then, the auxiliary inductor current $i_{La}$ must continue to travel to auxiliary capacitor $C_a$ through the second auxiliary diode $D_{a2}$ to complete a cycle of the operation of the dual-source converter in the dual-source mode.

According the volt-second balance theory, in the switch cycles of the first switch $S_1$ and the second switch $S_2$, the average of the voltage $v_{L1}$ across the first inductor and the average of the voltage $v_{L2}$ across the second inductor are zero. Their relationship can be represented by Equations (24a), (24b), (24c) and (24d) as follows:

$$[V_1(d_1+d_d)+(V_1-V_a)(d_{a1}+d_d)]T_s=0 \qquad (24a)$$

$$V_a=V_1/(d_{a1}+d_d) \qquad (24b)$$

$$[V_2(d_2+d_d)+(V_2-V_a)(d_{a2}+d_d)]T_s=0 \qquad (24c)$$

$$V_a=V_1/(d_{a2}+d_d) \qquad (24d)$$

According to Equations (17), (23), (24b) and (24d), with an assumption that the duty cycle $d_d$ of the dead zone time is very short, the sum of the first switch duty cycle $d_1$ and the first auxiliary switch duty cycle $d_{a1}$ is close to 1, and the sum of the second switch duty cycle $d_2$ and the second auxiliary switch duty cycle $d_{a1}$ is close to 1 so that Equations (23), (17), (24b) and (24d) can be rewritten to be Equations (25a), (25b), (25c) and (25d) as follows:

$$V_o=V_a(1-d_1)/(1+d_{dcm1}-d_1) \qquad (25a)$$

$$V_o=V_a(1-d_2)/(1+d_{dcm2}-d_2) \qquad (25b)$$

$$V_a=V_1/(1-d_1) \qquad (25c)$$

$$V_a=V_2/(1-d_2) \qquad (25d)$$

The average current of the output capacitor $C_o$ in all of the switch cycles is zero to retain the stability of the output voltage $V_o$. Moreover, the average current of the output capacitor $C_o$ is identical to the average current of the auxiliary inductor $L_a$. Furthermore, it is assumed that the reverse recovery current caused by the first auxiliary diode $D_{a1}$ in the Modes 7 and 14 is small and can be ignored. Thus, their relationship can be represented by Equation (26) as follows:

$$[(1-d_1)(1-d_1+d_{cm1})+[(1-d_2)(1-d_2+d_{cm2})](V_a-V_o)T_s/2L_a=V_o/R_o \qquad (26)$$

Based on Equations (25) and (26), the first non-continuous current mode duty cycle $d_{dcm1}$, the second non-continuous current mode duty cycle $d_{dcm2}$ and the output voltage $V_o$ can be represented by Equations (27a), (27b) and (27c).

$$d_{dcm1} = 0.5(1-d_1)\left[\sqrt{1+\frac{8L_a}{R_oT_sd_x}}-1\right] \qquad (27a)$$

$$d_{dcm2} = 0.5(1-d_2)\left[\sqrt{1+\frac{8L_a}{R_oT_sd_x}}-1\right] \qquad (27b)$$

$$V_o = 2V_1 \bigg/ \left\{(1-d_1)\left[1+\sqrt{1+\frac{8L_a}{R_oT_sd_x}}\right]\right\} \qquad (27c)$$

$$= 2V_2 \bigg/ \left\{(1-d_2)\left[1+\sqrt{1+\frac{8L_a}{R_oT_sd_x}}\right]\right\}$$

wherein the duty cycle $d_x$ can be simplified to be $(1-d_1)^2+(1-d_2)^2$. In addition, the first switch duty cycle $d_1$ and the second switch duty cycle $d_2$ can be derived from Equation (27c) and represented by Equation (28) as follows:

$$V_1/(1-d_1)=V_2/(1-d_2) \qquad (28)$$

From Equations (27a) to (27c), it can be known that when the dual-source converter 1' is in the dual-source mode, by controlling the duty cycles $T_1T_2$ & $T_a$ of the first switch $S_1$, the second switch $S_2$ and the auxiliary switch $S_a$, respectively, energy conversion with highly efficient boost is achieved. Moreover, based on the ratio of the voltage of the first power source $V_1$ over the voltage of the second power source $V_2$, there is an optimal combination of the first switch duty cycle $d_1$ with the second switch duty cycle $d_2$.

To verify the effects of the dual-source converter 1', some data obtained from the use thereof will be given later.

Figure 7:
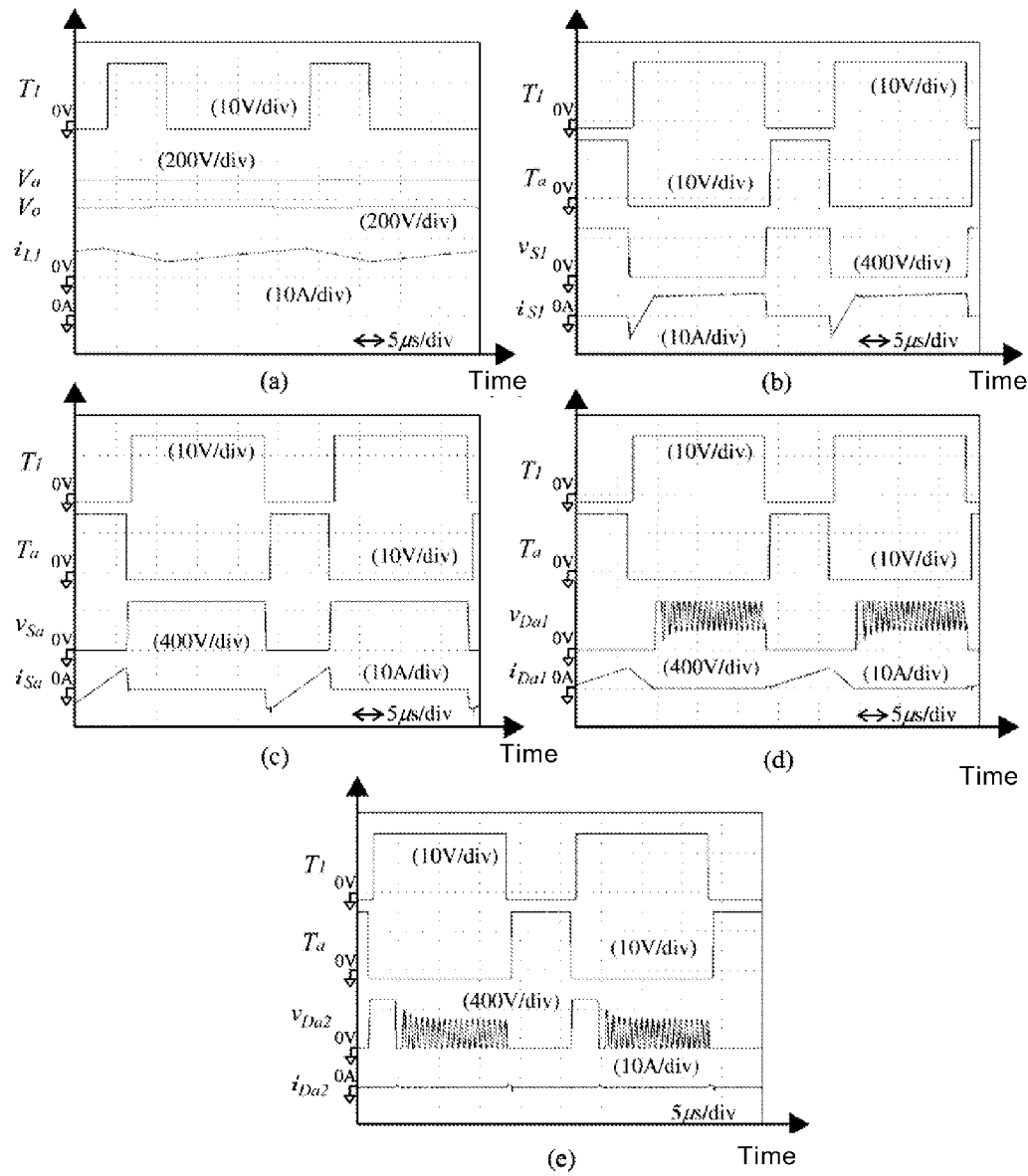
FIG. 7 shows the waveforms of various signals of the dual-source converter shown in FIG. 1 in the single-source mode.

Referring to FIG. 7, the first power source $V_1$ is a 120V DC power source, and the first power source $V_1$ imitates an output voltage from a solar cell. The second power source $V_2$ is a 160V DC power source, and the second power source $V_2$ imitates an output voltage from a wind turbine. The output voltage $V_o$ is a 360V high voltage DC bus voltage.

The specifications of the elements included in the dual-source converter 1' are listed in Table 1 as follows:

TABLE 1

Specification of Dual-Source Converter 1'

| Element | Symbol | Parameter |
| --- | --- | --- |
| First inductor | $L_1$ | 800uH |
| Second inductor | $L_2$ | 800uH |
| First switch | $S_1$ | IRFP460 |
| Second switch | $S_2$ | IRFP460 |
| Auxiliary switch | $S_a$ | IRFP460 |
| First auxiliary diode | $D_{a1}$ | MUR8100 |
| Second auxiliary diode | $D_{a2}$ | MUR8100 |
| Auxiliary capacitor | $C_a$ | 47uF |
| Auxiliary inductor | $L_a$ | 35uH |
| Output capacitor | $C_o$ | 47uF |

Referring to FIG. 7, in Part (a), there are shown the first switch-driving signal $T_1$, the auxiliary capacitor voltage $V_a$, the output voltage $V_o$ and the first inductor current $i_{L1}$. As shown in FIG. 7, Part (a), the first inductor current $i_{L1}$ continues and would not easily cause damages to the first power source $V_1$. The output voltage $V_o$ is controlled to be 360V.

Referring to FIG. 7, Part (b), there are shown the first switch-driving signal $T_1$, the auxiliary switch-driving signal $T_a$, the first switch voltage $v_{S1}$ and the first switch current $i_{S1}$. As shown in FIG. 7, Part (b), the first switch-driving signal $T_1$ and the auxiliary switch-driving signal $T_a$ are complementary to each other and provide brief dead zone time for each other to avoid short circuit of the auxiliary capacitor $C_a$ due to synchronous turning on of the switches $S_1$ and $S_a$. As shown in FIG. 7, Part (b), when the first switch $S_1$ is turned on, the first switch current $i_{S1}$ is negative, and the first switch $S_1$ can be switched at zero voltage to effectively reduce the loss in the switching and increase the conversion efficiency.

Referring to FIG. 7, Part (c), there are shown the first switch-driving signal $T_1$, the auxiliary switch-driving signal $T_a$, the auxiliary switch voltage $v_{Sa}$ and the auxiliary switch current $i_{Sa}$. As shown in FIG. 7, Part (c), when the auxiliary switch $S_a$ is turned on, the auxiliary switch current $i_{Sa}$ is negative, and the auxiliary switch $S_a$ can be switched at zero voltage.

Referring to FIG. 7, Part (d), there are shown the first switch-driving signal $T_1$, the auxiliary switch-driving signal $T_a$, the $v_{Da1}$ across the first auxiliary diode and the first auxiliary diode current $i_{Da1}$. Because the first auxiliary diode $D_{a1}$ is connected, in series, to the auxiliary inductor $L_a$, the waveform of the first auxiliary diode current $i_{Da1}$ goes up and down linearly, and effectively avoid a surge due to the 反向恢復 current in the output diode as would be in a conventional boost circuit.

Referring to FIG. 7, Part (e), there are shown the first switch-driving signal $T_1$, the auxiliary switch-driving signal $T_a$, the voltage $v_{Da2}$ across the second auxiliary diode and the second auxiliary diode current $i_{Da2}$. The second auxiliary diode $D_{a2}$ is used to suppress the voltage across $v_{Da1}$ the first auxiliary diode so that the voltage $v_{Da1}$ across the first auxiliary diode is retained to be the auxiliary capacitor voltage $V_a$.

Figure 8:
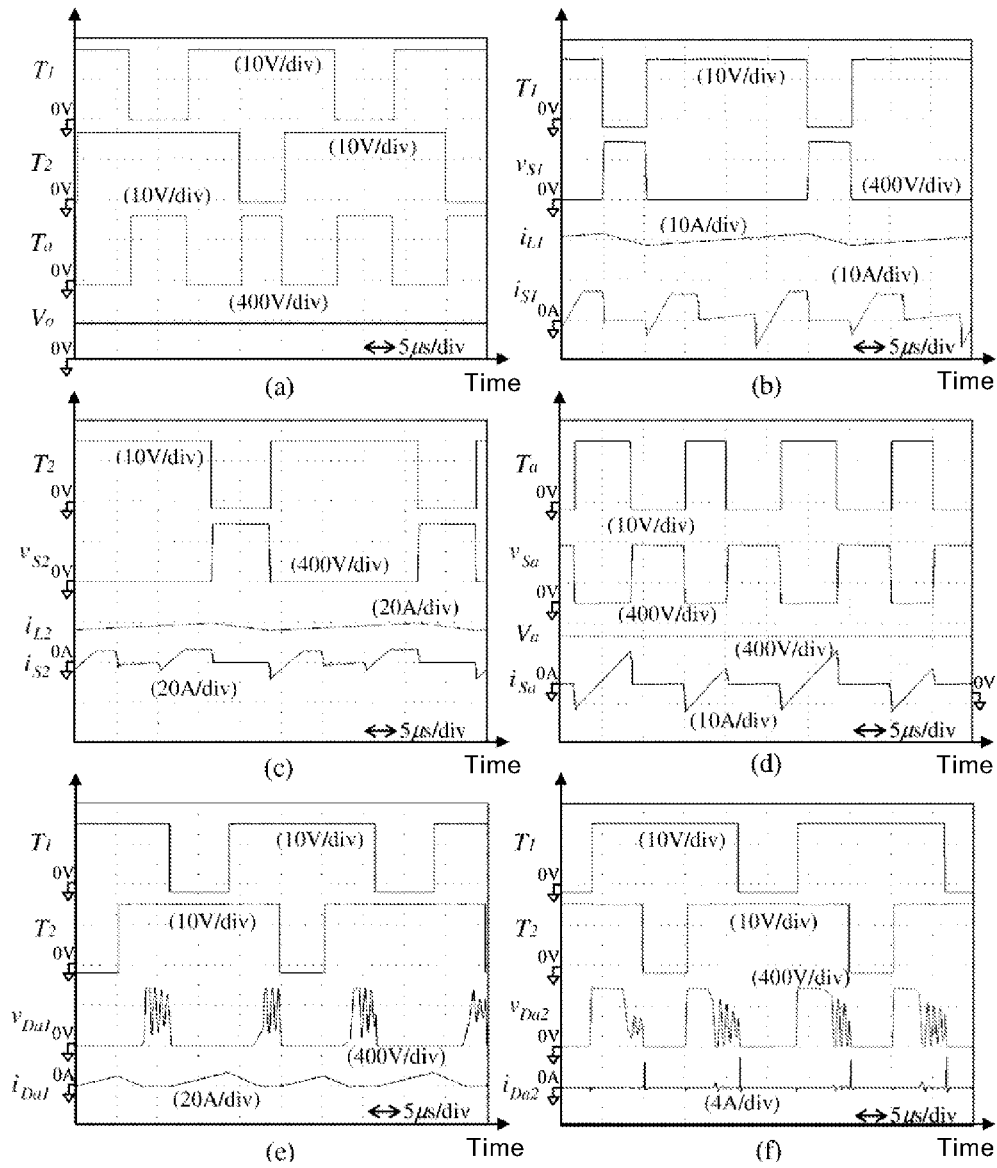
FIG. 8 shows the waveforms of various signals of the dual-source converter shown in FIG. 1 in the dual-source mode.

Referring to FIG. 8, the dual-source converter uses both of the first power source $V_1$ and the second power source $V_2$. The power of the output load $R_o$ is 5 kW.

Referring to FIG. 8, Part (a), there are shown first switch-driving signal $T_1$, the second switch-driving signal $T_2$, the auxiliary switch-driving signal $T_a$ and the output voltage $V_o$. As shown in FIG. 8, Part (a), the first switch-driving signal $T_1$ and the second switch-driving signal $T_2$ are complementary to the auxiliary switch-driving signal $T_a$, and provide brief dead zone time for each other to avoid short circuit of the auxiliary capacitor $C_a$ that would be caused by synchronous turning on of the first switch $S_1$, the second switch $S_2$ and the auxiliary switch $S_a$. The output voltage $V_o$ is controlled to be 360V.

FIG. 8, Part (b) shows the first switch-driving signal $T_1$, the first switch voltage $v_{S1}$, the first inductor current $i_{L1}$ and the first switch current $i_{S1}$. As shown in FIG. 8, Part (b), when the first switch $S_1$ is turned on, the first switch current $i_{S1}$ is negative, and the first switch $S_1$ can be switched at zero voltage to reduce the loss in the switching and increase the conversion efficiency. Moreover, when the second switch $S_2$ is turned on, the first switch current $i_{S1}$ is reduced to $i_{L1}-i_{L2}$ and the loss in the switching is reduced, and the conversion efficiency is further increased.

FIG. 8, Part (c) shows the second switch $T_2$, the second switch voltage $v_{S2}$, the second inductor current $i_{L2}$ and the second switch current $i_{S2}$. As shown in FIG. 8, Part (c), when the second switch $S_2$ is turned on and the second switch current $i_{S2}$ is negative, the second switch $S_2$ can be switched at zero voltage. In addition, when the first switch $S_1$ is turned on, the second switch current $i_{S2}$ is reduced to $i_{L2}-i_{L1}$. Now, the second switch current $i_{S2}$ is negative but much smaller than the original second inductor current $i_{L2}$ so that the loss in the turning on is further reduced.

FIG. 8, Part (d) shows the auxiliary switch-driving signal $T_a$, the auxiliary switch voltage $v_{Sa}$, the auxiliary capacitor voltage $V_a$ and the auxiliary switch current $i_{Sa}$. As shown in FIG. 8, Part (d), when the auxiliary switch $S_a$ is turned on, the auxiliary switch current $i_{Sa}$ is negative, and the auxiliary switch $S_a$ can be switched at zero voltage.

FIG. 8, Part (e) shows the first switch-driving signal $T_1$, the second switch-driving signal $T_2$, the voltage $v_{Da1}$ across the first auxiliary diode and the first auxiliary diode current $i_{Da1}$. Because the first auxiliary diode $D_{a1}$ is connected, in series, to the auxiliary inductor $L_a$, the waveform of the first auxiliary diode current $i_{Da1}$ goes up and down linearly.

FIG. 8, Part (f) shows first switch-driving signal $T_1$, the second switch-driving signal $T_2$, the voltage $v_{Da2}$ across the second auxiliary diode and the second auxiliary diode current $i_{Da2}$. The second auxiliary diode $D_{a2}$ is used to suppress the voltage $v_{Da1}$ across the first auxiliary diode so that the first auxiliary diode voltage $v_{Da1}$ is controlled to be the auxiliary capacitor voltage $V_a$.

Figure 9:
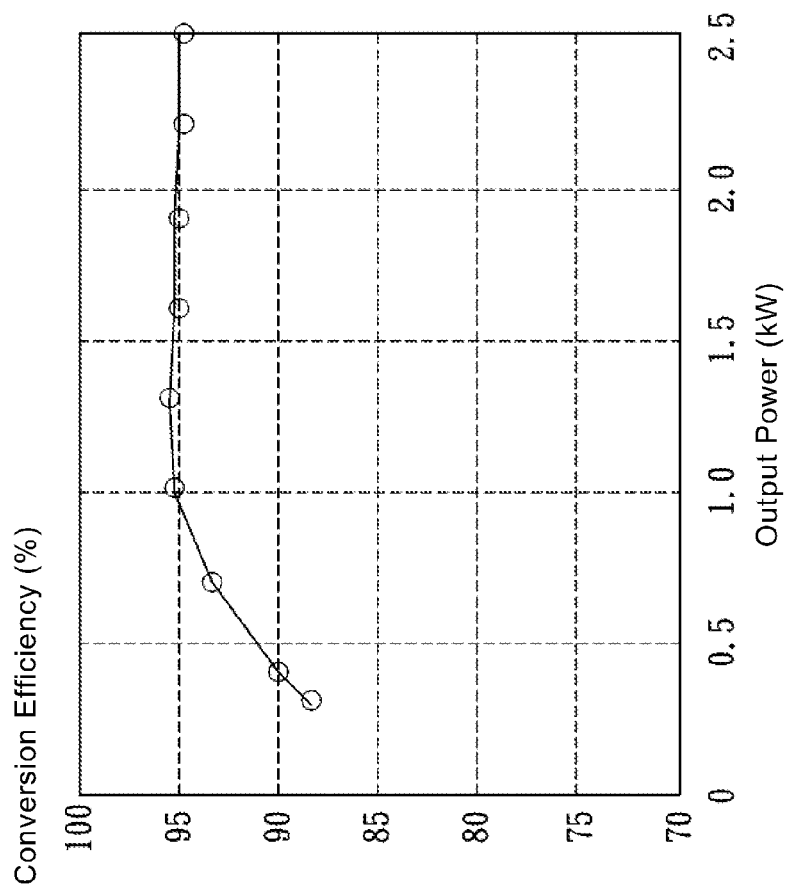
FIG. 9 shows the conversion efficiency of the dual-source converter shown in FIG. 1 in the single-source mode.
Figure 10:
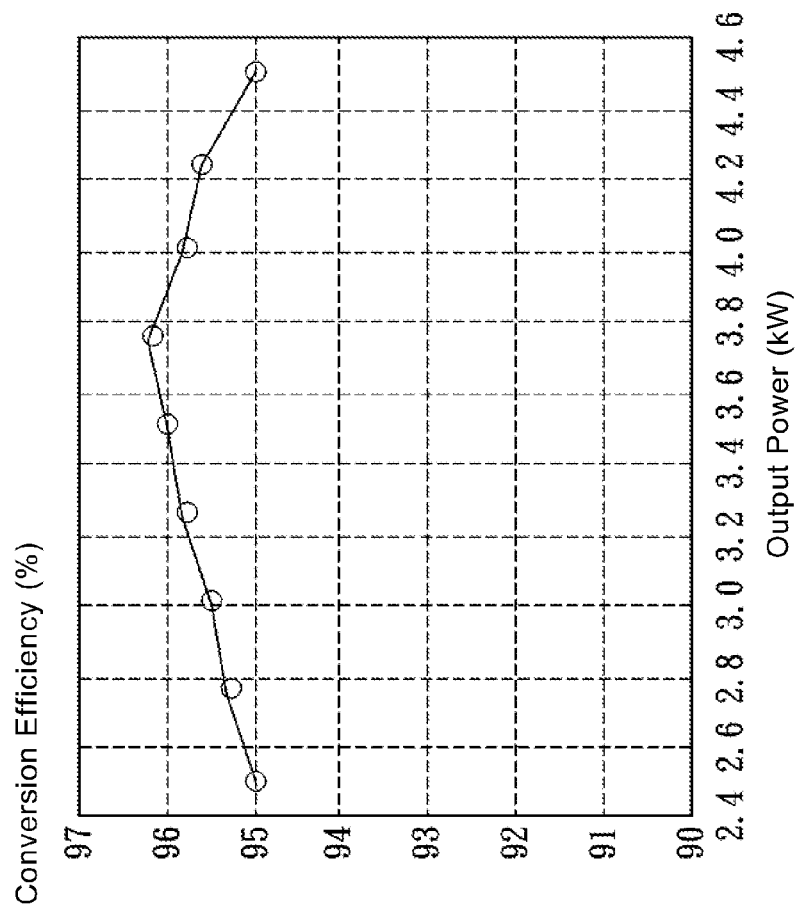
FIG. 10 shows the conversion efficiency of the dual-source converter shown in FIG. 1 in the dual-source mode.

Finally, referring to FIGS. 9 and 10, there is shown the conversion efficiency of the dual-source converter by simulation. FIG. 9 shows the conversion efficiency of the dual-source converter 1' in the single-source mode wherein only the first power source $V_1$ is used. There are two conditions for simulation. At first, the first power source $V_1$ is 120V. Secondly, the output voltage $V_o$ is 360V. As shown in FIG. 9, the conversion efficiency can be as high as 95.6%.

FIG. 10 shows the conversion efficiency of the dual-source converter 1' is in the dual-source mode wherein both of the power source $V_1$ and the second power source $V_2$ are used. There are two conditions for simulation. At first, the first power source $V_1$ is 120V. Secondly, the second power source $V_2$ is 160V. The output voltage $V_o$ is 360V. The conversion efficiency can be as high as 96.2%.

Based on the data obtained by simulation referring to FIGS. 9 and 10, it is verified that the dual-source converter of the present invention provides high conversion efficiency.

As discussed above, according to the present invention, the power sources at different voltages are connected, in series, to each other and converted to a stable power source, and the dual-source converter can be switched between the single-source mode and the dual-source mode. In the dual-source mode, the dual-source converter effectively reduces the loss in the turning on and increases the conversion efficiency. With the auxiliary circuit, all of the switches can be switched at zero voltage to achieve flexible switching. Furthermore, the inductor current in the dual-source converter continues to travel to effectively filter out current ripples to avoid damages of a device operated on the renewable energy.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:
1. A dual-source converter including:
  a first power source circuit including a first power-source switch and a first switch, wherein the first power-source switch is electrically connected to a first power source, wherein the first switch is coupled to the first power-source switch, wherein the first power source circuit converts the first power source to a first current source;
  a second power source circuit connected, in series, to the first power source circuit, wherein the second power source circuit includes a second power-source switch and a second switch, wherein the second power-source switch is electrically connected to a second power source, wherein the second switch is coupled to the second power-source switch, wherein the second power source circuit converts the second power source to a second current source;

an auxiliary circuit including:
an auxiliary switch including first and second ends, wherein the second end of the auxiliary switch is coupled to a first end of the first switch;
a first auxiliary diode including first and second ends, wherein the first end of the first auxiliary diode is electrically connected to the second end of the auxiliary switch;
a second auxiliary diode including first and second ends, wherein the first end of the second auxiliary diode is electrically connected to the second end of the first auxiliary diode, wherein the second end of the second auxiliary diode is electrically connected to the first end of the auxiliary switch, wherein the second auxiliary diode is used to suppress a voltage across the first auxiliary diode;
an auxiliary capacitor including first and second ends, wherein the first end of the auxiliary capacitor is electrically connected to the first end of the auxiliary switch, wherein the second end of the auxiliary capacitor is electrically connected to the second end of the second switch, wherein the auxiliary capacitor is used to store energy of the first and second current sources; and
an auxiliary inductor including first and second end, wherein the first end of the auxiliary inductor is electrically connected to the second end of the first auxiliary diode, wherein the auxiliary inductor is used to release the energy of the first and second current sources from the auxiliary capacitor, wherein the auxiliary circuit stores or releases the energy of the first and second current sources by switching the auxiliary switch;
an output circuit electrically connected to the auxiliary circuit, wherein the output circuit receives the energy of the first and second current sources from the auxiliary inductor; and
a closed-loop controller electrically connected to the first and second power source circuits, the auxiliary circuit and the output circuit, wherein based on a feedback signal and a command signal, the closed-loop controller controls duty cycles of the first and second switches and the auxiliary switch so that the first and second switches and the auxiliary switch can be switched at zero voltage, wherein the closed-loop controller controls the switching of the first and second power switches so that the first and second power sources are connected or cut off.

2. The dual-source converter according to claim 1, wherein each of the first power source and the second power source is selected from the group consisting of a secondary cell, a super capacitor, a fuel cell, a solar cell, a DC wind turbine and a rectified AC wind turbine.

3. The dual-source converter according to claim 1, wherein the first power source circuit further includes a first inductor between the first power-source switch and the first switch, wherein the second power source circuit further includes a second inductor between the second power-source switch and the second switch, wherein the first inductor and the second inductor respectively filter out current ripples from the first power source and the second power source and store the energy of the first and second power sources.

4. The dual-source converter according to claim 1, wherein the first power source circuit further includes a first inductor connected, in parallel, to the first power source, wherein the second power source circuit further includes a second inductor connected, in parallel, to the second power source, wherein the first inductor and the second inductor respectively filter out current ripples from the first power source and the second power source and store the energy of the first and second power sources.

5. The dual-source converter according to claim 1, wherein the closed-loop controller includes:
a controlling circuit for comparing the feedback signal with the command signal and providing a controlling signal according to the comparison; and
a driving circuit for providing a plurality of driving signals to the first switch, the second switch and the auxiliary switch according to the controlling signal, wherein the driving circuit provides a plurality of switching signals to the first power-source switch and the second power-source switch.

6. The dual-source converter according to claim 5, wherein the feedback signal is provided from the first power source circuit, the second power source circuit or the output circuit, wherein the command signal is a nominal current or voltage corresponding to the feedback signal.

7. The dual-source converter according to claim 5, wherein the driving signals include a first switch-driving signal, a second switch-driving signal and an auxiliary switch-driving signal, wherein the auxiliary switch-driving signal is the sum of a signal complementary to the first switch-driving signal and another signal complementary to the second switch-driving signal.

8. The dual-source converter according to claim 7, wherein the duty cycles of the first switch-driving signal and the second switch-driving signal get longer but the duty cycle of the auxiliary switch-driving signal gets shorter as the controlling signal gets larger, wherein the duty cycles of the first switch-driving signal and the second switch-driving signal get shorter but the duty cycle of the auxiliary switch-driving signal gets longer as the controlling signal gets smaller.

9. The dual-source converter according to claim 5, wherein the switching signals include a first power-source switch-switching signal and a second power source-switching signal to control the switching of the first power-source switch and the second power-source switch, respectively.

10. The dual-source converter according to claim 1, wherein when the first auxiliary diode builds a reverse-biased voltage, while an auxiliary inductor current continues to travel through the auxiliary inductor, the second auxiliary diode provides a path with a reduced loss in turning on, wherein the auxiliary inductor current travels to the auxiliary capacitor through the second auxiliary diode to reduce a current that travels through a parasitic diode of the auxiliary switch.

* * * * *